(12) United States Patent
Kyo

(10) Patent No.: US 6,208,362 B1
(45) Date of Patent: Mar. 27, 2001

(54) SIMPLE IMAGE PROCESSING SYSTEM AND METHOD CAPABLE OF REDUCING OCCURRENCE OF UNWANTED OVERHEAD

(75) Inventor: Sholin Kyo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/917,743

(22) Filed: Aug. 27, 1997

(30) Foreign Application Priority Data

Aug. 27, 1996 (JP) .................................................. 8-225659

(51) Int. Cl.[7] .................................................... G06F 15/00
(52) U.S. Cl. ............................ 345/514; 345/501; 712/16
(58) Field of Search ..................................... 345/501–506, 345/507, 509, 514; 395/800.01, 800.1, 800.11, 800.14, 800.16–800.18, 800.2, 800.21–800.26, 800.43, 561, 570; 712/1, 10, 11, 14, 16, 18, 20, 21, 22, 25, 26, 27, 43

(56) References Cited

U.S. PATENT DOCUMENTS

| 5,175,802 | * | 12/1992 | Crookshanks | 382/278 |
| 5,197,140 | | 3/1993 | Balmer | 712/20 |
| 5,315,699 | * | 5/1994 | Imai et al. | 345/501 |
| 5,361,385 | | 11/1994 | Bakalash | 345/427 |
| 5,408,328 | * | 4/1995 | Boliek et al. | 358/261.4 |
| 5,432,909 | * | 7/1995 | Cok | 709/251 |
| 5,513,282 | * | 4/1996 | Williams | 382/303 |
| 5,581,778 | * | 12/1996 | Chin et al. | 395/800.16 |
| 5,625,836 | * | 4/1997 | Barker et al. | 395/200.44 |
| 5,805,915 | * | 9/1998 | Wilkinson et al. | 712/20 |
| 5,828,894 | * | 10/1998 | Wilkinson et al. | 395/800.2 |
| 5,832,138 | * | 11/1998 | Nakanishi et al. | 382/281 |
| 5,842,031 | * | 11/1998 | Barker et al. | 395/800.23 |
| 5,860,084 | * | 1/1999 | Yaguchi | 711/105 |
| 5,974,521 | * | 10/1999 | Akerib | 712/11 |

FOREIGN PATENT DOCUMENTS

| 63-36544 | 7/1988 | (JP) . |
| 6-20041 | 1/1994 | (JP) . |

OTHER PUBLICATIONS

Sakai et al., Journal of Institute of Information, vol. 30, No. 12, pp. 1562–1571.

Okabe, Naoki et al., "Path Extension Method for Variable Neighborhood Distance Transformation of 2- and 3-Dimensional Digitized Pictures", *The Transactions of the Institute of Electronics, Information and Communication Engineers*, vol. J71–D(5); pp. 819–829 (1988).

* cited by examiner

*Primary Examiner*—Ulka J. Chauhan
(74) *Attorney, Agent, or Firm*—Foley & Lardner

(57) ABSTRACT

In an image processing system or method, an image element memorizing device memorizes image elements which are image data that are subjects of process. An image element processing state memorizing device memorizes present processing states of the image elements in the image element memorizing device. A detecting device detects, in response to the present processing states, a pointer of one of the image element that is capable of being processed by the image processing system. A temporary pointer memorizing device memorizes the pointer from the detecting device. A calculating device reads the pointer from the temporary pointer memorizing device to process an image in response to the image element of the pointer which is read.

9 Claims, 18 Drawing Sheets

FIG. 4

| 1 | 2 | 3 |
|---|---|---|
| 4 | 0 | 8 |
| 7 | 6 | 5 |

|  | TEST IMAGE OF 32×32 | TEST IMAGE OF 64×64 | TEST IMAGE OF 128×128 | TEST IMAGE OF 256×256 |
|---|---|---|---|---|
| REPEAT NUMBER IN CONVENTION MANNER (a) | 32×3=96 | 64×4=256 | 128×10=1280 | 256×20=5120 |
| REPEAT NUMBER IN EMBODYMENT OF THIS INVENTION (b) | 32+16=48 | 64+39=103 | 128+101=129 | 256+320=576 |
| (b)/(a) | 0.5 | 0.4 | 0.18 | 0.11 |

SIMPLE IMAGE PROCESSING SYSTEM AND METHOD CAPABLE OF REDUCING OCCURRENCE OF UNWANTED OVERHEAD

BACKGROUND OF THE INVENTION

This invention relates to an image processing system and method which speedily process image data by use of a processor array.

A conventional processor array comprises processor elements which are equal in a number to X×Y, where each of X and Y represents an integer greater than one. Ordinarily, each of the processor elements is in charge of predetermined image elements. Therefore, in case that the processor array can process, in parallel, the image elements, accelerating of process is easily realized in response to a number of the processor elements. While, in case that the processor array can not process, in parallel, the image elements, for example, in case that the processor array process the image elements which are processed in base on an image process algorithm that has a collating sequence so that the processor array processes an image element after processing another image element, there is a problem that accelerating of process is, in situ, not realized in response to the number of the processor elements. Conventionally, to resolve the problem of the type, there is provided an image processing system which is described in Japanese Examined Patent Prepublication No. 36544/1988. This image processing system comprises an execution control system which is based on data operation of command level so that each of the processor elements can dynamically detect and process a command which is capable of being processed. Namely, the image processing system produces numbers of the processor elements which are in charge of execution numbers of data to be queued, commands to be executed in case that queuing conditions are realized, a command to be next executed, and packets having informations related to execution and control. The image processing system supplies the packets to a combined network of the processor elements. When the packet arrives at a predetermined one of the processor elements and when a queuing condition is realized, the one of the processor elements executes commands which are written in the packet to produce a packet having an information of a command to be next executed.

The image processing system has a disadvantage that the image processing system is complex. This is because, since it needs to enter the informations of execution into the packet, the packet becomes greater. Therefore, it is complex to produce and process the packet and it needs a plurality of bandwidths of the combined network which is supplied with the packet.

The image processing system has another disadvantage that an unwanted overhead occurs when a serial sequence of commands is executed. This is because, the image processing system starts, through the packet, the even command which is capable of being, in series, executed, a number of unwanted processing steps occurs in comparsion with general pipeline execution when the serial sequence of commands is executed. This is described in such as the document ["consideration on architecture optimization in data operation computer" written Sakai et al., Journal of Institute of Information Vol. 30, No. 12, pp. 1562–1571].

SUMMARY OF THE INVENTION

It is therefore an object of this invention to provide an image processing system which is simple.

It is another object of this invention to provide an image processing system which has an advantage that an unwanted overhead does not occur even when a serial sequence of commands is executed.

Other objects of this invention will become clear as the description proceeds.

According to a first aspect of this invention, there is provided an image processing system comprising:

image element memorizing means for memorizing image elements which are image data that are subjects of process;

pointer detecting means for detecting a pointer of one of the image elements that is capable of being processed by the image processing system, the pointer representing a position of the one of the image elements;

temporary pointer memorizing means connected to the pointer detecting means for memorizing the pointer from the pointer detecting means; and calculating means connected to the image element memorizing means and the temporary pointer memorizing means for reading the pointer and processing an image in response to the image element of the pointer which is read.

According to a second aspect of this invention, there is provided an image processing system comprising:

image element memorizing means for memorizing image elements which are image data that are subjects of process;

image element processing state memorizing means for memorizing present processing states of the image elements in the image element memorizing means;

pointer detecting means connected to the image element processing state memorizing means for detecting, in response to the present processing states, a pointer of one of the image elements that is capable of being processed by the image processing system, the pointer representing a position of the one of the image elements;

temporary pointer memorizing means connected to the pointer detecting means for memorizing the pointer from the pointer detecting means; and calculating means connected to the image element memorizing means and the temporary pointer memorizing means for reading the pointer and processing an image in response to the image element of the pointer which is read.

According to a third aspect of this invention, there is provide an image processing system comprising:

image element memorizing means for memorizing image elements which are image data that are subjects of process;

image element processing state memorizing means for memorizing present processing states of the image elements in a plurality of tasks in the image element memorizing means;

pointer detecting means connected to the image element processing state memorizing means for detecting, in response to the present processing states, a pointer of one of the image elements that is capable of being processed by the image processing system, the pointer representing a position of the one of the image elements;

temporary pointer memorizing means connected to the pointer detecting means for memorizing the pointer in each of the tasks from the pointer detecting means; and calculating means connected to the image element memorizing means and the temporary pointer memorizing means for reading the pointer and processing an image in response to the image element of the pointer which is read.

According to a fourth aspect of this invention, there is provide an image processing system comprising:

image element memorizing means for memorizing image elements which are image data that are subjects of process;

image element processing state memorizing means for memorizing present processing states of the image elements in a plurality of tasks in the image element memorizing means;

pointer detecting means connected to the image element processing state memorizing means for detecting, in response to the present processing states, a pointer of one of the image elements that is capable of being processed by the image processing system, the pointer representing a position of the one of the image elements;

temporary pointer memorizing means connected to the pointer detecting means for memorizing the pointer in each of the tasks from the pointer detecting means;

calculating means connected to the image element memorizing means and the temporary pointer memorizing means for reading the pointer and processing an image in response to the image element of the pointer which is read; and task changing means connected to the temporary pointer memorizing means and the calculating means for changing one of the tasks to another of the tasks which is processed by the calculating means when a process of the image elements of the pointer in the one of the tasks is ended.

According to a fifth aspect of this invention, there is provide an image processing method comprising:

a step of memorizing image elements which are image data that are subjects of process;

a step of detecting a pointer of one of the image elements that is capable of being processed by the image processing method, the pointer representing a position of the one of the image elements;

a step of memorizing the pointer from the step of detecting a pointer; and a step of reading the pointer and processing an image in response to the image element of the pointer which is read.

According to a sixth aspect of this invention, there is provide an image processing method comprising:

a step of memorizing image elements which are image data that are subjects of process;

a step of memorizing present processing states of the image elements in the step of memorizing image element;

a step of detecting, in response to the present processing states, a pointer of one of the image elements that is capable of being processed by the image processing method, the pointer representing a position of the one of the image elements;

a step of memorizing the pointer from the step of detecting a pointer; and a step of reading the pointer and processing an image in response to the image element of the pointer which is read.

According to a seventh aspect of this invention, there is provide an image processing method comprising:

a step of memorizing image elements which are image data that are subjects of process;

a step of memorizing present processing states of the image elements in a plurality of tasks in the step of memorizing image element;

a step of detecting, in response to the present processing states, a pointer of one of the image elements that is capable of being processed by the image processing method, the pointer representing a position of the one of the image elements;

a step of memorizing the pointer in each of the tasks from the step of detecting a pointer; and a step of reading the pointer and processing an image in response to the image element of the pointer which is read.

According to an eighth aspect of this invention, there is provide an image processing method comprising:

a step of memorizing image elements which are image data that are subjects of process;

a step of memorizing present processing states of the image elements in a plurality of tasks in the step of memorizing image element;

a step of detecting, in response to the present processing states, a pointer of one of the image elements that is capable of being processed by the image processing method, the pointer representing a position of the one of the image elements;

a step of memorizing the pointer in each of the tasks from the step of detecting a pointer;

a step of reading the pointer and processing an image in response to the image element of the pointer which is read; and a step of changing one of the tasks to another of the tasks which is processed by the step of processing an image when a process of the image elements of the pointer in the one of the tasks is ended.

BRIEF DESCRIPTION OF THE DRAWING

FIG. 4 is a view for use in describing an operation of the image processing system illustrated in FIG. 1;

FIG. 5 is a view for use in describing a first state of the operation of the image processing system illustrated in FIG. 1;

FIG. 6 is a view for use in describing a second state of the operation of the image processing system illustrated in FIG. 1;

FIG. 7 is a view for use in describing a third state of the operation of the image processing system illustrated in FIG. 1;

FIG. 8 is a view for use in describing a fourth state of the operation of the image processing system illustrated in FIG. 1;

FIG. 9 is a view for use in describing a fifth state of the operation of the image processing system illustrated in FIG. 1;

FIG. 10 is a view for use in describing a sixth state of the operation of the image processing system illustrated in FIG. 1;

FIG. 11 is a view for use in describing a seventh state of the operation of the image processing system illustrated in FIG. 1;

FIG. 12 is a view for use in describing an eighth state of the operation of the image processing system illustrated in FIG. 1;

FIG. 13 is a view for use in describing a ninth state of the operation of the image processing system illustrated in FIG. 1;

FIG. 14 is a view for use in describing a tenth state of the operation of the image processing system illustrated in FIG. 1;

FIG. 15 is a view for use in describing an eleventh state of the operation of the image processing system illustrated in FIG. 1;

FIG. 16 is a view for use in describing a twelfth state of the operation of the image processing system illustrated in FIG. 1;

FIG. 17 is a view for use in describing a thirteenth state of the operation of the image processing system illustrated in FIG. 1;

DESCRIPTION OF THE PREFERRED EMBODIMENTS

Figure 1:
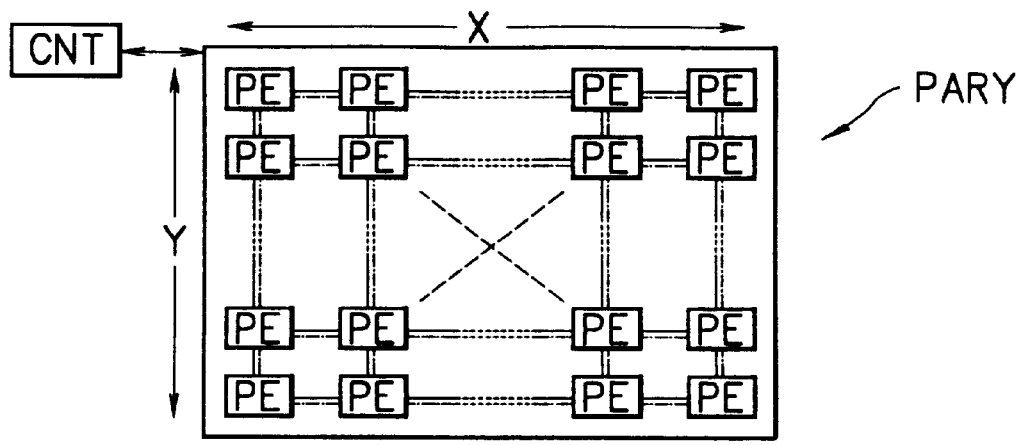
FIG. 1 is a block diagram of an image processing system according to a first embodiment of this invention.

Referring to FIGS. 1 to 16, an image processing system according to a first embodiment of this invention will be described. In FIG. 1, the image processing system comprises a processor array PARY. The processor array PARY comprises processor elements PE {x, y} which are equal in a number to X×Y, where each of X and Y represents an integer greater than one, x represents an integer between 0 to X−1, and y represents an integer between 0 to Y−1. Also, the processor array PARY comprises a control unit CNT connected to the processor elements PE {x, y}. The control unit CNT executes to download a program to each of the processor elements PE {x, y} and to supply a command to each of the processor elements PE {x, y}. Also, the control unit CNT executes tabulation of status and broadcast of data in each of the processor elements PE {x, y}.

Figure 2:
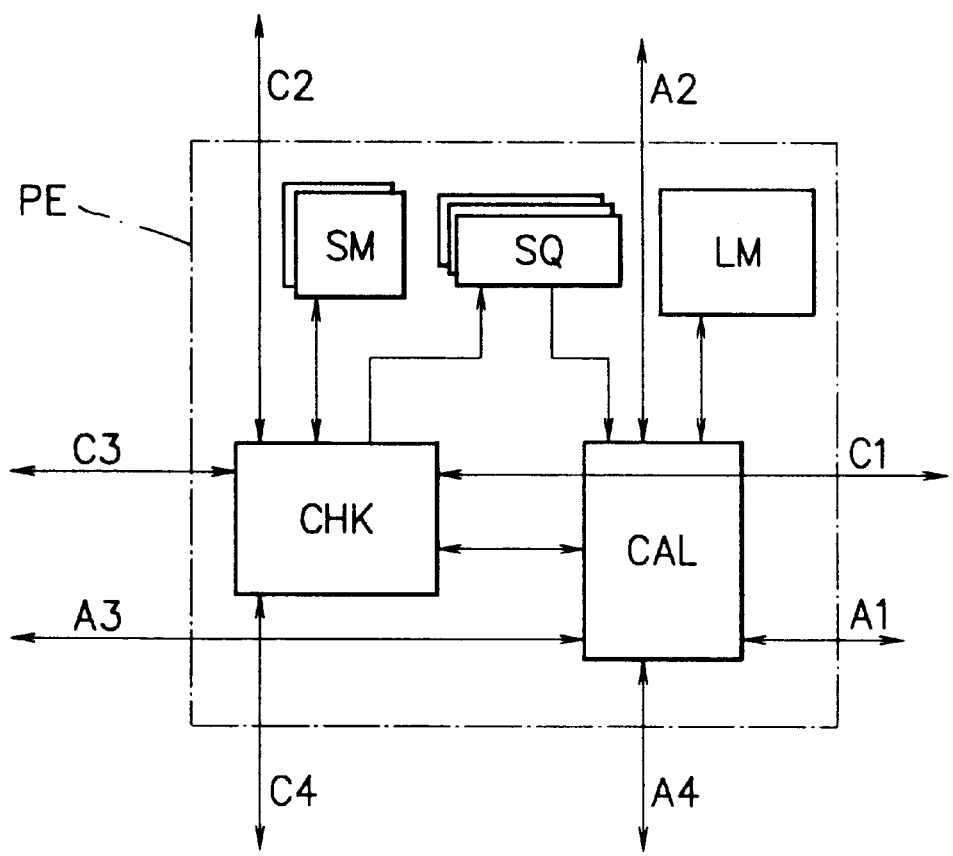
FIG. 2 is a block diagram of a processor element of the image processing system illustrated in FIG. 1.

In FIG. 2, each of the processor elements PE {x, y} comprises an image element memorizing device LM {x, y}, a temporary pointer memorizing device SQ [q] {x, y}, an image element processing state memorizing device SM [s] {x, y}, a calculating device CAL {x, y}, and a detecting device CHK {x, y}. The image element memorizing device LM {x, y} memorizes image elements which are image data that are subjects of process. The temporary pointer memorizing device SQ [q] {x, y} memorizes pointers of the image elements to be processed. The temporary pointer memorizing device SQ [q] {x, y} always outputs elements from a front portion of the elements and receives the elements from a front portion or an end portion of the elements. The temporary pointer memorizing device SQ [q] {x, y} comprises pointer memorizing devices which are equal in a number to Q, where Q represents an integer greater than one and q represents an integer between o to Q−1. The image element processing state memorizing device SM [s] {x, y} memorizes present processing states of the image elements in the image element memorizing device LM {x, y}. The image element processing state memorizing device SM [s] {x, y} comprises processing state memorizing devices which are equal in a number to S, where S represents an integer greater than one and s represents an integer between o to S−1. Each of the processing state memorizing devices comprises memorizing elements of about few bits.

The calculating device CAL {x, y} is connected to the image element memorizing device LM {x, y}, the temporary pointer memorizing device SQ [q] {x, y}, and the detecting device CHK {x, y}. The calculating device CAL {x, y} takes out data from a front portion of the data in the temporary pointer memorizing device SQ [q] {x, y}. The calculating device CAL {x, y} executes reference and definition to each of the image elements in the image element memorizing device LM {x, y}. Also, the calculating device CAL {x, y} has an arithmetical logical calculation capability which uses values of the image elements as operand. The detecting device CHK {x, y} is connected to the temporary pointer memorizing device SQ [q] {x, y}, the image element processing state memorizing device SM [s] {x, y}, and the calculating device CAL {x, y}. The detecting device CHK {x, y} supplies data to the calculating device CAL {x, y} and receives the data from the calculating device CAL {x, y}. The detecting device CHK {x, y} supplies data to the temporary pointer memorizing device SQ [q] {x, y}. The detecting device CHK {x, y} executes reference and definition to each of the image elements in the image element processing state memorizing device SM [s] {x, y}. Also, The detecting device CHK {x, y} has a logical calculation capability which calculates between the image elements.

Adjacent ones of the processor elements PE {x, y} are connected through communication paths A1 to A4. In case that X is equal to one, A1 and A3 are not existent. Also, in case that Y is equal to one, A2 and A4 are not existent. Adjacent ones of the detecting devices CHK {x, y} are connected through communication paths C1 to C4. In case that X is equal to one, C1 and C3 are not existent. Also, in case that Y is equal to one, C2 and C4 are not existent.

Figure 3:
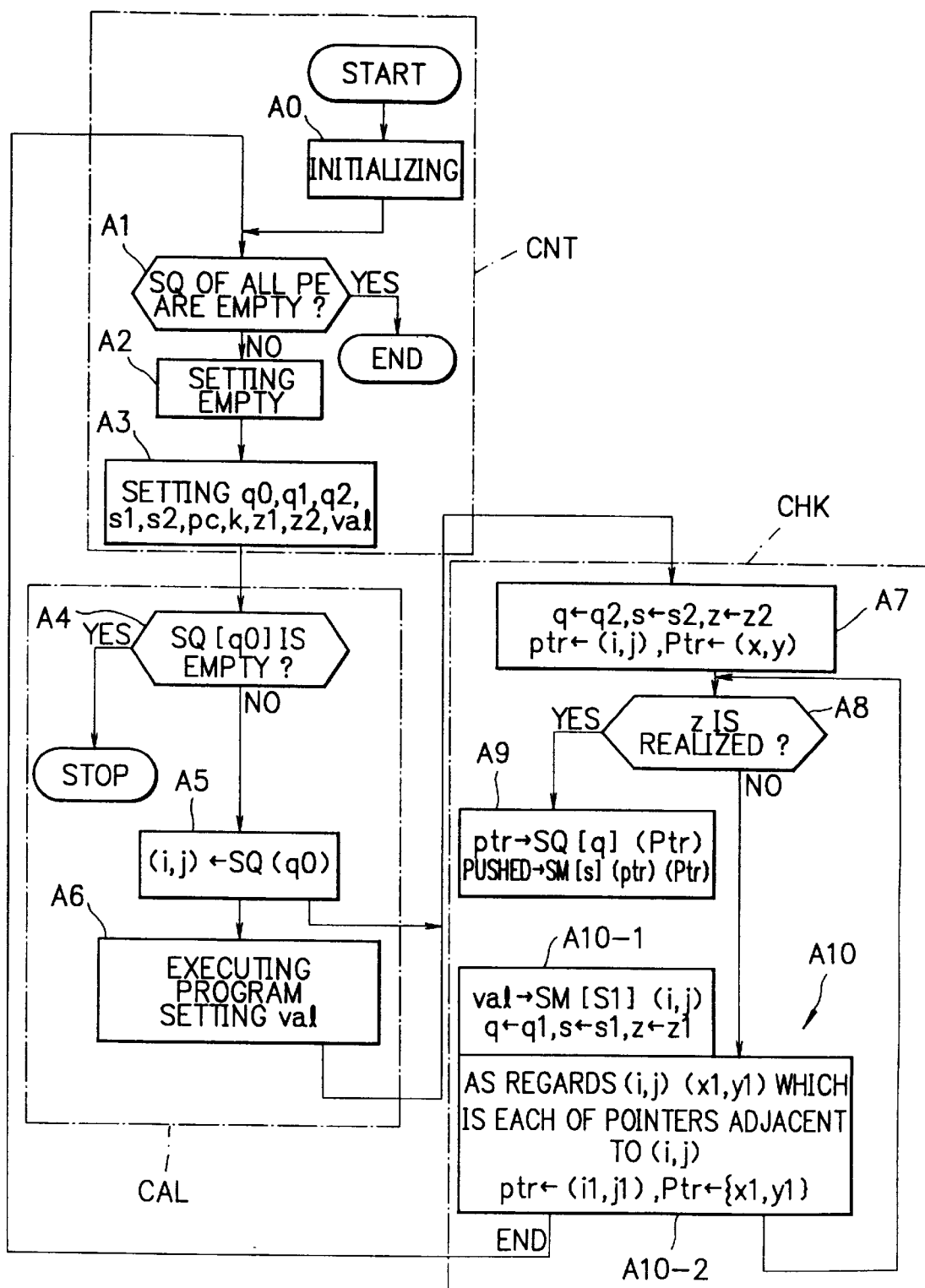
FIG. 3 is a flow chart for use in describing an operation of the image processing system illustrated in FIG. 1.

Next, referring to FIG. 3, an operation of the control unit CNT and the processor elements PE {x, y} in the processor array PARY will be described in detail. In addition, as explained below, variables q, q0, q1, q2, s, s1, s2, EMPTY, k, Z, z1, z2, val, ptr, and Ptr are used. In this event, the variables q, q0, q1, and q2 are for specifying one of the pointer memorizing devices in the temporary pointer memorizing device SQ [q] {x, y} that are equal in a number to Q. The variables s, s1, and s2 are for specifying one of the processing state memorizing devices in the image element processing state memorizing device SM [s] {x, y} that are equal in a number to S. The variable EMPTY is for representing one of the pointer memorizing devices in the temporary pointer memorizing device SQ [q] {x, y} that is empty. The variables k, Z, z1, z2, and val are for prescribing an operation of the detecting device CHK {x, y}. The variable ptr is for representing store of the pointer to the image element. The variable Ptr is for representing store of the pointer to the processor elements PE {x, y}. Also, in case that an ambiguity is specially not caused, in representation of PE {x, y}, {x, y} which is pointer to PE is omitted. Namely, the representation of PE {x, y} is only written by PE. In addition, in representation of such as LM {x, y}, SQ [q] {x, y}, SM [s] {x, y}, CAL {x, y}, and CHK {x, y}, {x, y} is omitted. For example, the representation of SQ [q] {x, y} is only written by SQ [q].

The processor array PARY executes steps A0 to A10. The control unit CNT executes the steps A0 to A3. Each of the processor elements PE {x, y} executes the steps A4 to A10. The calculating device CAL the executes steps A4 to A6. The detecting device CHK executes the steps A7 to A10.

At the step A0, the control unit CNT executes initialization. Namely, the control unit CNT broadcasts pointer {i, j} of a suitable image element to each of the processor elements PE. In this event, in each of the processor elements PE, the detecting device CHK supplies the {i, j} to a suitable temporary pointer memorizing device SQ. The step A0 proceeds to the step A1 at which the control unit CNT discriminates whether or not all temporary pointer memorizing devices SQ in the all processor elements PE are empty. When the all temporary pointer memorizing devices SQ in the all processor elements PE are empty, all processes are ended. Otherwise, the step A1 proceeds to the step A2 at which the control unit CNT sets variable EMPTY representing that any ones of SQ of 0 to Q−1 are empty.

The step A2 proceeds to the step A3 at which the control unit CNT sets, in response to the variable EMPTY, suitable values between 0 to Q−1 as the variables q0, q1, and q2. The control unit CNT sets, in response to the variable EMPTY, suitable values between 0 to S−1 as the variables s1 and s2. Also, the control unit CNT sets, in response to the variable EMPTY, suitable values as the variables such as pc, k, z2, z1, and val.

The step A3 proceeds to the step A4 at which the processor element PE discriminates whether or not the SQ [q0] is empty. When the SQ [q0] is empty, the process is stopped. Otherwise, the step A4 proceeds to the step A5 at which the processor element PE pops datum of the SQ [q0] from a head portion of the SQ [q0]. This datum which is popped is pointer to the image element and are hereafterwritten (i, j). Also, the image element of the LM that is indicated by the (i, j) is written LM (i, j). The image elementof the SM that is indicated by the s indicated by the (i, j) is written SM [s] (i, j). In addition, the processor element PE also supplies the (i, j) to the detecting device CHK. The step A5 proceeds to the step A6. In case of specifying, the step A5 proceeds to the step A7.

At the step A6, for example, the calculating device CAL processes, as operand, such as an adjacent image element to the image element LM (i, j). In addition, when the adjacent image element of the image element LM (i, j) exists in another processor element PE, the calculating device CAL is supplied with the adjacent image element from the other processor element PE through the communication paths A1 to A4. Thereafter, in case of specifying, the step A6 proceeds to the step A7 at which the operation of the detecting device CHK is started.

At the step A7, q2 is substituted in the variable q, s2 is substituted in the variable s, (i, j) is substituted in the variable ptr, and (x, y) is substituted in the variable Ptr. The step A7 proceeds to the step A8 at which the detecting device CHK checks whether or not the condition Z is realized. In addition, the check is carried out by the detecting device CHK of the processor elements PE that is indicated by the Ptr, namely, CHK (Ptr). Also, when it is necessary to make, in the check, reference to elements of the SM in the processor elements PE except the processor element PE which is indicated by the Ptr, the detecting devices CHK mutually supplies the elements to the other detecting devices CHK and mutually receives the elements from the other detecting devices CHK through the communication paths C1 to C4. When the condition Z is realized, the step A8 proceeds to the step A9. Otherwise, the step A8 proceeds to the step A10. At the step A9, the CHK (Ptr) inserts the ptr to the SQ [q] (Ptr) and sets the SM [s] (ptr) (Ptr) at PUSHED.

The step A10 comprises steps A10-1 and A10-2. At the step A10-1, the detecting device CHK substitutes val, q1, s1, and z1 to the SM [s1] (i, j), q, s, and Z, respectively. Thereafter, at the step A10-2, the ptr is set at (i1, j1) and the Ptr is set at {x1, y1} in each of an adjacent pointer (i1, j1) {x1, y1} which is indicated by K of the (i, j). In this condition, the process of the steps A8, A9, and A10-2 is repeated in a number of the pointers. Thereafter, the process returns to the step A1. In addition, the {x1, y1} represents pointer of the processor element PE in which an element indicated by (i1, j1) is existent. In case that an element indicated by (i, j) and an element indicated by (i1, j1) exist in the same processor element PE, the {x1, y1} is equal to the {x, y}.

The above mentioned operation of the image processing system according to the first embodiment of this invention is put in order as follow. At the step A0, the pointer of the image element to be first processed is stored in a suitable SQ of 0 to Q−1. Next, in the repeated operation of the steps A1 to A10, the control unit CNT, the calculating device CAL, and the detecting device CHK are operated as follow.

At the steps A1 to A3, the control unit CNT is operated as follow. The control unit CNT tests all processor elements PE. When all SQ are empty, all processes are stopped. Otherwise, the control unit CNT sets the variable EMPTY representing that any ones of SQ of 0 to Q−1 are empty. The control unit CNT sets, in response to the variable EMPTY, suitable numbers of SQ to q0, q1, and q2, suitable numbers of SM to s1 and s2, and program counter pc. Also, the control unit CNT sets, in response to the variable EMPTY, the variables k, z2, z1, val, q, s, Z, ptr, and Ptr which prescribe the operation of the detecting device CHK.

At the steps A4 to A10, each of the processor elements PE is operated as follow. In each of the processor elements PE, the calculating device CAL takes out the pointer to the image element to be processed and processes the image element indicated by the pointer until the SQ [q0] is empty. The detecting device CHK detects the image element to be next processed and stores the pointer of the image element to SQ [q1] or SQ [q2]. Thereafter, the step A10 returns to the step A1. Namely, the calculating device CAL, as repeated operation, takes out the pointer of the image element in the SQ from the front portion of the SQ and processes the image element indicated by the pointer until all SQ of all processor elements PE are empty. In addition, if necessary, the calculating device CAL processes the image element indicated by the pointer with reference of the adjacent image element value in the image element. The detecting device CHK discriminates whether or not the adjacent image element of the image element that is indicated materializes a predetermined condition. When the adjacent image element of the image element that is indicated materializes the predetermined condition, the detecting device CHK supplies the pointer of the image element to the suitable SQ in the suitable processor element PE.

As mentioned, in the image processing system according to the first embodiment of this invention, while the calculating device CAL carries out process of the image element, the detecting device CHK, in series, tests corresponding SM. Therefore, the detecting device CHK dynamically detects the pointer of the image element which is capable of being processed to store the pointer to the SQ. As a result, it is possible to effectively process the image element.

Next, the description will proceed to first and second concrete execution examples of the image processing system according to the first embodiment of this invention. Each of the first and second concrete execution examples is uniformly determined by specifying following conditions. The conditions are to, in what manner, initialize each of the SQ at the step A0, to, in what manner, set q0, q1, q2, s1, s2, pc, k, z1, z2, and val at the step A3, to start the operation of the step A7 at either the step A5 or the step A6, and to, in what manner, execute the process.

The description will proceed to the first concrete execution example as regards an algorithm that is a concrete execution example of a serial image process. The algorithm executes distance transformation to an image by scanning the image two times in opposite directions. The algorithm is described in the document "G. Borgefors, Distance Transformation in Digital Images, Computer Vision, Graphics, and Image Processing, 34, pp. 344–371, 1986". In addition, the distance transformation is a process for transferring an image element value of each of a frontground image element in a binary image to a distance value to a background image element which is nearest to the frontground image element.

In the LM of each of the processor elements PE, binary image elements which are equal in a number to I×L and each of which has either MAX or 0 are previously memorized. Also, in response to this, in the SM of each of the processor elements PE, elements which are equal in a number to I×L and each of which has either FIN or FRONT are previously memorized.

In the first concrete execution example of the image processing system which uses the algorithm which executes distance transformation to the image by scanning the image two times in opposite directions, the conditions are given as follow. At the step A0, (0, 0) is supplied to each of the processor elements PE. In a time of first passing the step A3, the conditions are given as follow. The q0 and q1 are at qa which is a number of one of SQ that is not empty. The q2 is at qb which is a number of one of SQ that is not empty. The s1 and s2 are, respectively, set at sa and sb which are numbers of the suitable SM, where sa is not equal to sb. The pc is set at a front portion of a executable image element detecting subprogram. The k is set at portions 6 and 8 in FIG. 4 except the case that element at the portions 6 and 8 exist in the other processor element PE. The z2 is set at a condition that the SM [s] (ptr) (Ptr) has FRONT and adjacent elements of the portions 1, 2, 3, and 4, as a center of the SM [s] (ptr) (Ptr), in FIG. 4 have FIN. The z1 is set at a condition that SM [s] (ptr) (Ptr) is a state except PUSHED. The val is set at SM [s2] (ptr). At the step A5, the step A7 is set to be started.

When the SQ [q0] is first empty in a time of passing the step A3, namely, when preparation of start of process for first scanning is ended, the conditions are given as follow. The q0 and q1 are at qa which is a number of one of SQ that is not empty. The q2 is at qb which is a number of one of SQ that is not empty. Values of the s1 and s2 are exchanged each other. The pc is set at a front portion of a distance calculating subprogram DISTA. The k is set at portions 5, 6, 7, and 8 in FIG. 4. The z2 is set at a condition that the SM [s] (ptr) (Ptr) has FRONT and adjacent elements of the portions 5, 6, 7, and 8, as a center of the SM [s] (ptr) (Ptr), in FIG. 4 has FIN. The z1 is set at a condition that the SM [s] (ptr) (Ptr) has FRONT and adjacent elements of the portions 1, 2, 3, and 4, as a center of the SM [s] (ptr) (Ptr), in FIG. 4 have FIN. The val is set at FIN. At the step A5, the step A7 is set to be started.

When the SQ [q0] is second empty in a time of passing the step A3, namely, when process for first scanning is ended, the conditions are given as follow. The pc is set at the front portion of the distance calculating subprogram DISTB. The k is set at portions 1, 2, 3, and 4 in FIG. 4. The z2 is set at a condition that the z2 is unconditionally not realized. The z1 is set at a condition that the SM [s] (ptr) (Ptr) has FRONT and adjacent elements of the portions 5, 6, 7, and 8, as a center of the SM [s] (ptr) (Ptr), in FIG. 4 have FIN. The conditions except the above mentioned conditions are set at the same conditions in case that the SQ [q0] is first empty in a time of passing the step A3.

When the SQ [q0] is third empty in a time of passing the step A3, namely, when process for second scanning is ended, the conditions are not set because the SQ of all numbers are empty.

At the step A6, the process is executed in obedience to a sequence of command which is broadcasted from the control unit CNT. In addition, it is assumed that (i, j) hereafter represents the pointer to the image element which is popped at the step A5. An executable image element detecting subprogram section does not execute any processes.

Figure 4:
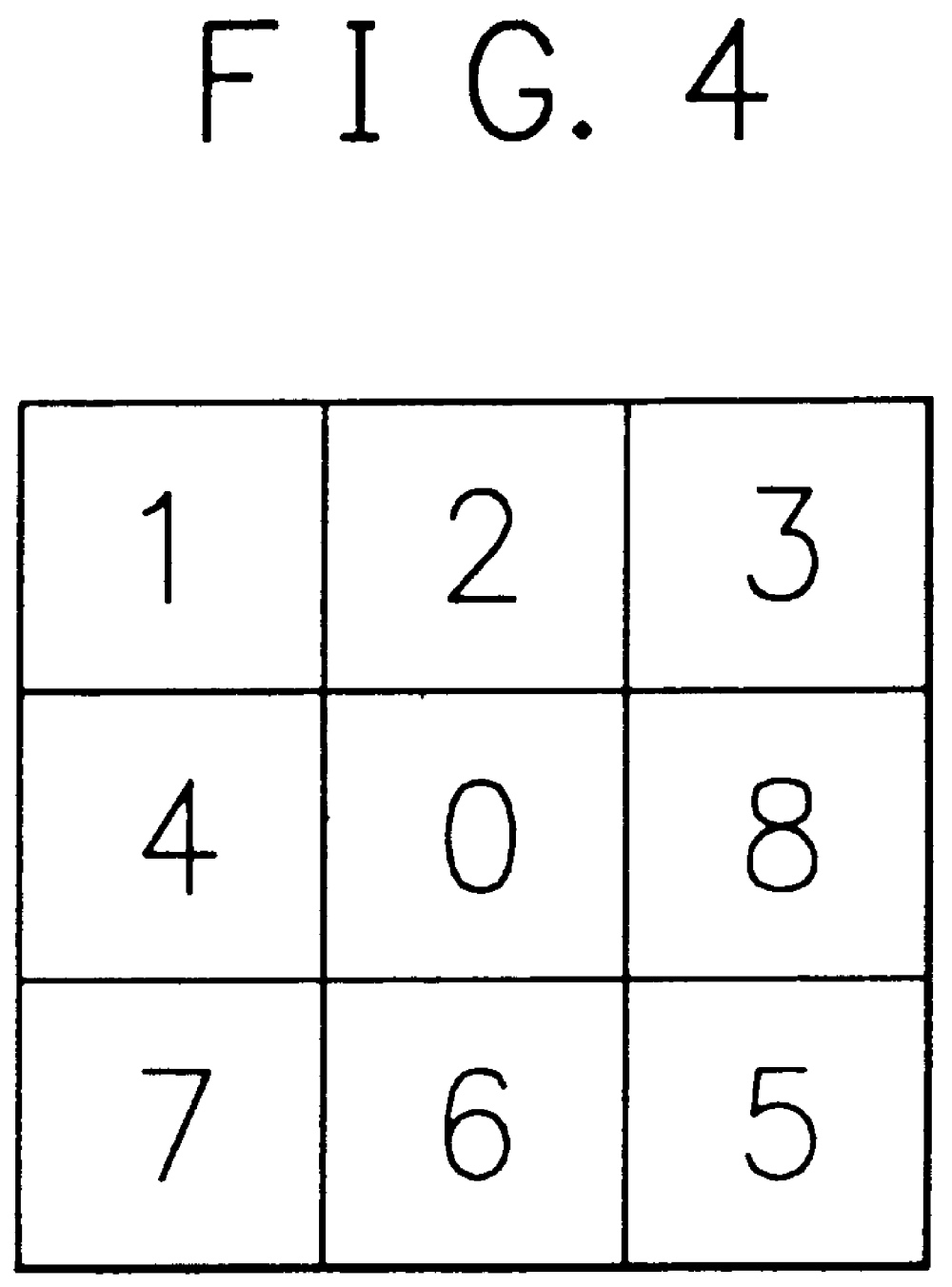

A process of the distance calculating subprogram DISTA is a process for rewriting the LM (i, j) by a value which is equal to the minimum value of the LM (i, j), a value added VD to an image element value at portion 1 in FIG. 4, a value added VD to an image element value at portion 2 in FIG. 4, a value added VD to an image element value at portion 3 in FIG. 4, and a value added VD to an image element value at portion 4 in FIG. 4. A process of the distance calculating subprogram DISTB is a process for rewriting the LM (i, j) by a value which is equal to the minimum value of the LM (i, j), a value added VD to an image element value at portion 5 in FIG. 4, a value added VD to an image element value at portion 6 in FIG. 4, a value added VD to an image element value at portion 7 in FIG. 4, and a value added VD to an image element value at portion 8 in FIG. 4.

FIGS. 5 to 10 show progresses in the middle of the process and a final result of the process of the first concrete execution example. In this event, the conditions are determined as follow. The VS is 2 and the VD is 3. Binary test images which includes eight objects which have middle sizes are subjects. An image size is equal to 32×32. A number of the processor elements PE in the processor array PARY is equal to X×Y. An image size I×J which is stored in each of the processor elements PE is that X is equal to 32, Y is equal to 1, I is equal to 1, and J is equal to 32. Therefore, in the LM of each of the processor elements PE, adjacent binary image elements which are equal in a number to 1×32, namely, which are arranged in a column. Each of the binary image elements has either MAX or o, where MAX is equal to 255. The pointer which indicates each of the image elements is equal to a value between (0, 0) to (0, 31). Also, {x, y} is equal to a value between {0, 0} to {31, 0}.

Figure 5:
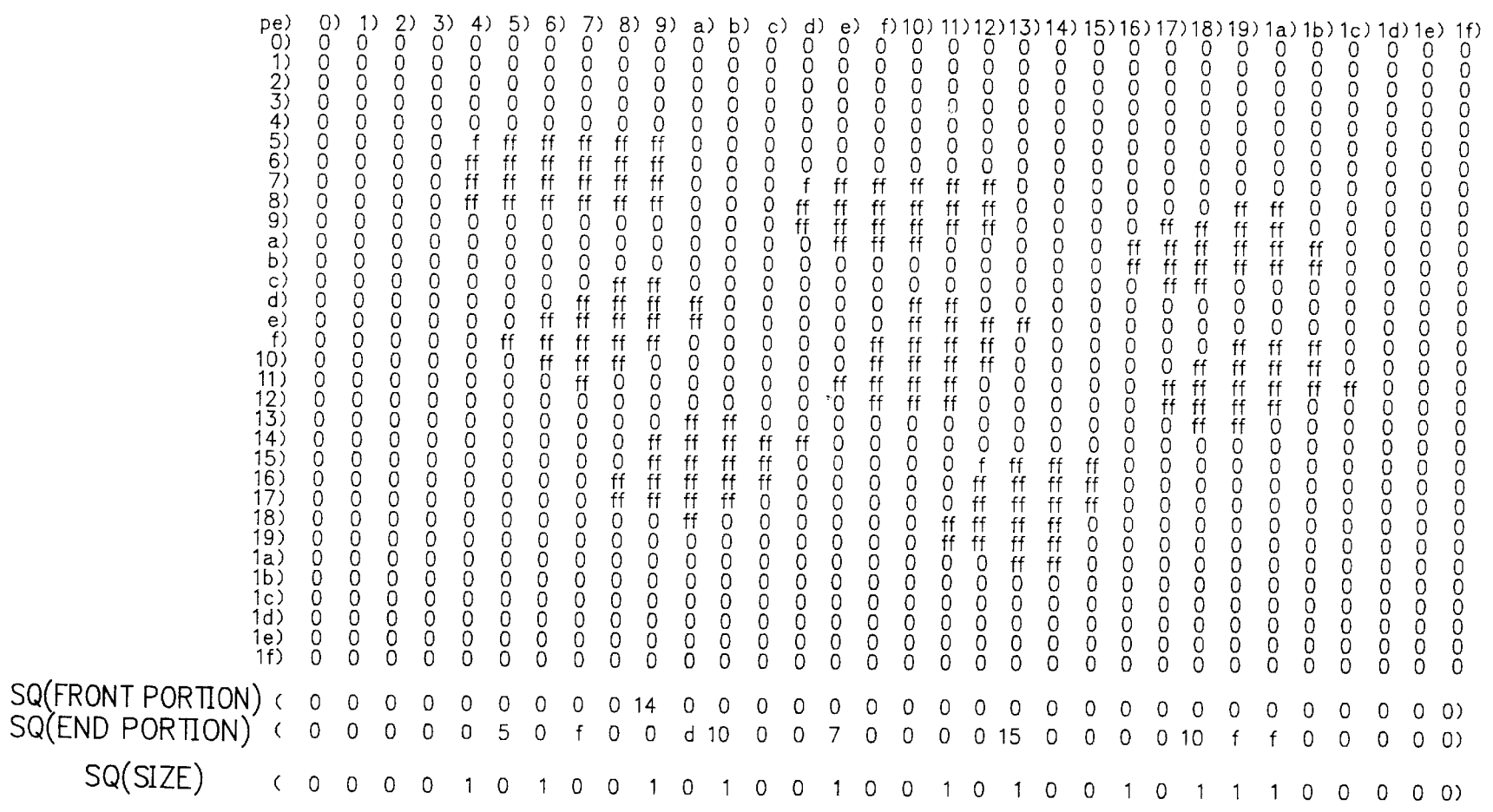
Figure 7:
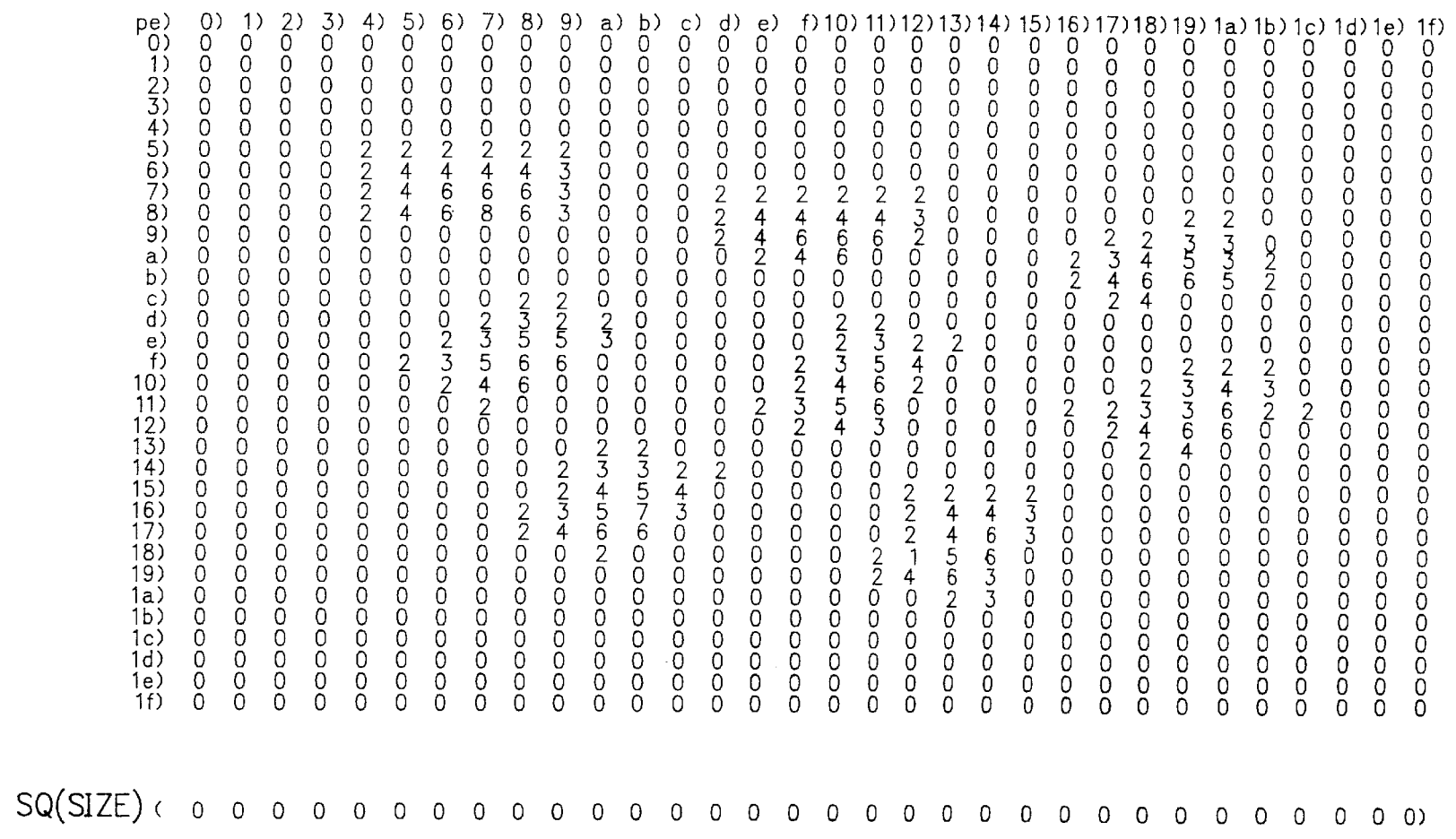
Figure 8:
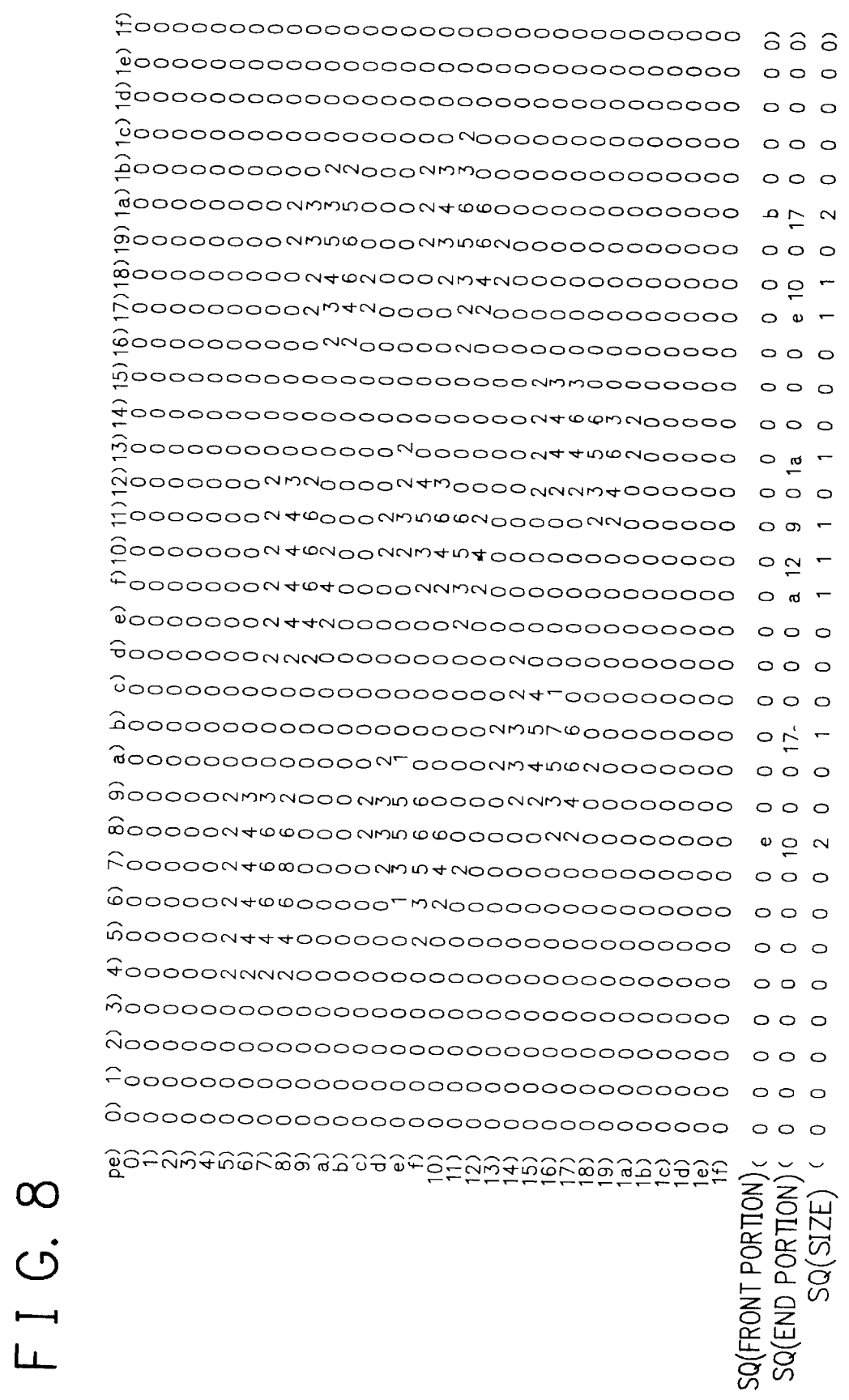
Figure 9:
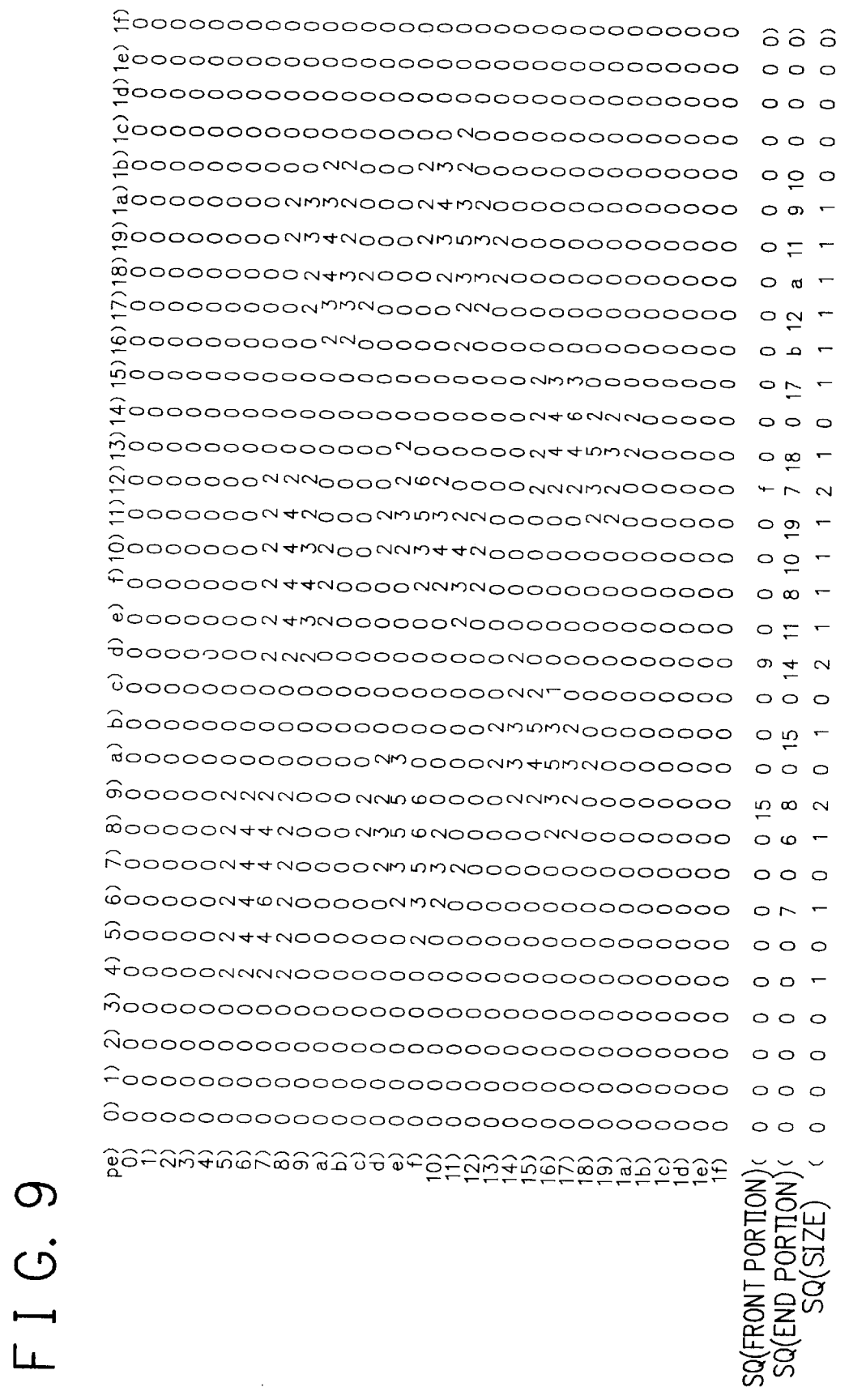
Figure 10:
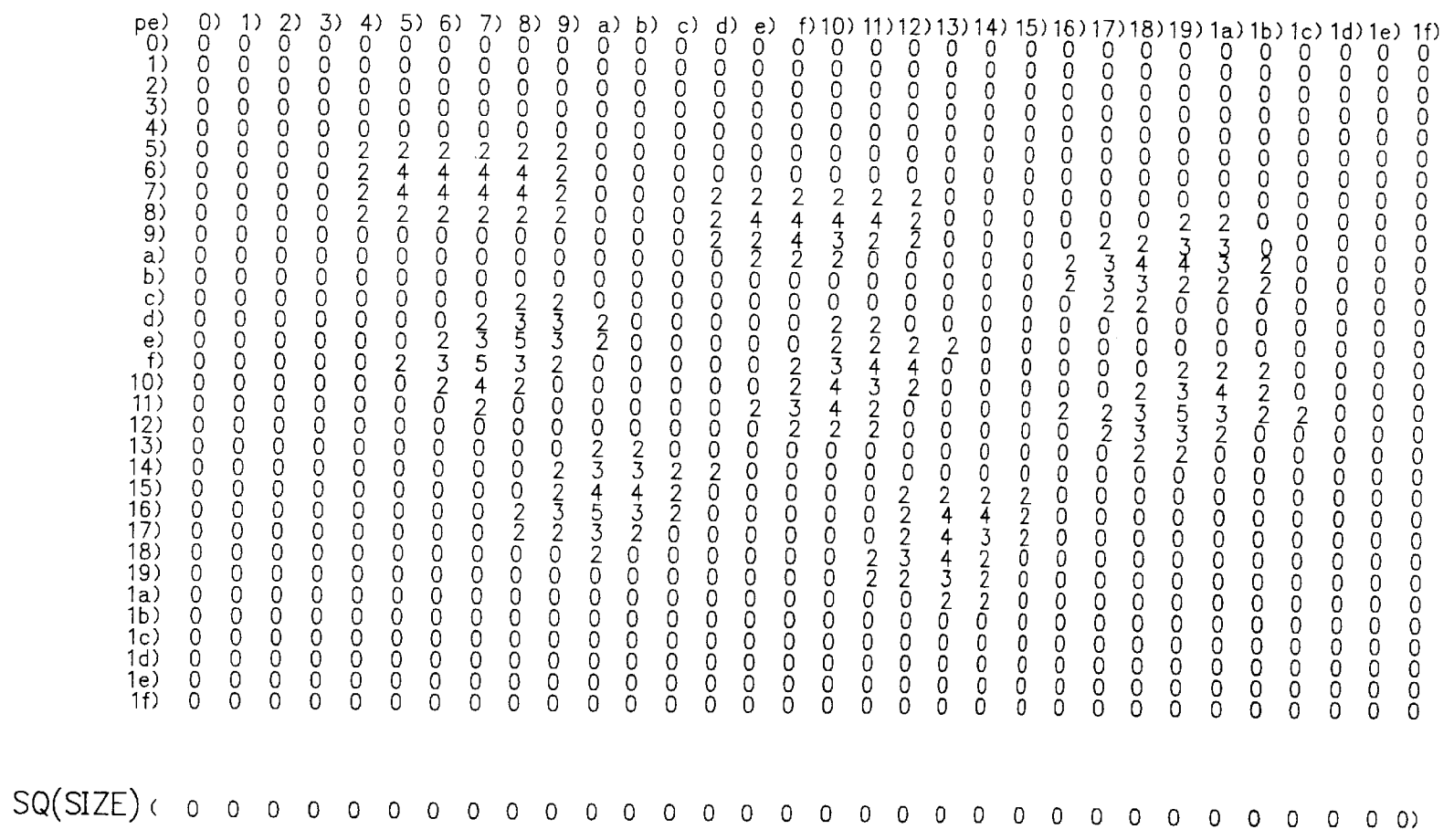

Namely, FIG. 5 shows a state of the SQ [q0] and LM of all processor elements PE in case of ending repeat 1 of first scanning. FIG. 6 shows a state of the SQ [q0] and LM of all processor elements PE in case of ending repeat 5 of the first scanning. FIG. 7 shows a state of the SQ [q0] and LM of all processor elements PE in case of ending repeat of the first scanning. FIG. 8 shows a state of the SQ [q0] and LM of all processor elements PE in case of ending repeat 1 of second scanning. FIG. 9 shows a state of the SQ [q0] and LM of all processor elements PE in case of ending repeat 5 of the second scanning. FIG. 10 shows a state of the SQ [q0] and LM of all processor elements PE in case of ending repeat of the second scanning. FIG. 10 represents a distance image of a process result. In addition, in FIGS. 5 to 10, all numerals are represented by hexadecimal notation. Numerals of o to 31 (31 is represented by 1f in hexadecimal notation) are, as numbers of the processor elements PE, written for marks in a row which straight extend to right as starting from point of pe) which is positioned in the left upper. Numerals of o to 31 (31 is represented by 1f in hexadecimal notation) are, as address values of y components in the LM of each of the processor elements PE, written for marks in a column which straight extend under as starting from point of pe).

The sum total of the number of repeat times of the process of the test image shown in FIGS. 5 to 10 is equal to 67. This is because the number of repeat times of the preparation process for first scanning is equal to 32, the number of repeat times of the process for first scanning is equal to 19, and the number of repeat times of the process for second scanning is equal to 16. On the other hand, the sum total of the number of repeat times of the process of the test image in the manner which is described in Japanese Unexamined Patent Prepublication (kokai) No. 055552/1996 is equal to (2×(32−1)+ 32)=188. Namely, according to the first concrete execution example of the first embodiment of this invention, it is possible to realize the equal process in the number of repeat times which is equal to about ⅓ of that of the conventional manner.

The description will proceed to a second concrete execution example of the first embodiment of this invention. The second concrete execution example relates to a process which executes a thinning process to the image to obtain a skeleton line and to obtain image element number (skeleton line length) which comprise the skeleton line. In addition, it is assumed that a foreground image element having a background image element as an adjacent image element is called an outline image element, the thinning process is a process for repeating to delete an image element which, at a point of time, becomes the outline image element when each of objects which are formed by collection of the foreground image elements of the image, in the middle of the process, is divided. Namely, the thinning process is a process for deleting, one layer by one layer, the object in order from the outside. The thinning process has a limitation that it is impossible to start to delete next layer before end of deletion of a layer.

It is assumed that adjacent image elements which are equal in a number to I×J are previously stored in the LM of the processor elements PE, where each of the adjacent image elements has either FRONT or BACK. Also, in response to this, it is assumed that image elements which are equal in a number to I×J are previously stored in the SM of the processor elements PE, where each of the image elements has either FRONT or BACK.

In the second concrete execution example of the first embodiment of this invention, conditions are given as follow. At the step A0, (0, 0) is supplied to each of the processor elements PE. In a time of first passing the step A3, the conditions are given as follow. The q0 and q1 are at qa which is a number of one of SQ that is not empty and is selected. The q2 is at qb which is a number of one of SQ that is not empty and is selected. The s1 and s2 are, respectively, set at sa and sb which are numbers of the suitable SM, where sa is not equal to sb. The pc is set at a front portion of a executable image element detecting subprogram. The k is set at portions 6 and 8 in FIG. 4 except the case that element at the portions 6 and 8 exist in the other processor element PE. The z2 is set at a condition that the SM [s] (ptr) (Ptr) has FRONT and at least one of elements of the portions 1 to 8, as a center of the SM [s] (ptr) (Ptr), in FIG. 4 has BACK. The z1 is set at a condition that SM [s] (ptr) (Ptr) is a state except PUSHED. The val is set at SM [s2] (ptr). At the step A5, the step A7 is set to be started.

When the SQ [q1] is not empty and the SQ [q0] is first empty in a time of passing the step A3, namely, when preparation of thinning process is ended, the conditions are given as follow. The q0 is at qa which is a number of one of SQ that is not empty and is selected. The q1 and q2 are at qb and qc which are numbers of two of SQ that are empty and are selected. Values of the s1 and s2 are not exchanged. The pc is set at a front portion of an image element deleting subprogram. The k is set at portions 1 to 8 in FIG. 4. The z2 is set at a condition that the val has FIN. The z1 is set at a condition that the SM [s] (ptr) (Ptr) has FRONT and at least one of adjacent elements of the portions 1 to 8, as a center of the SM [s] (ptr) (Ptr), in FIG. 4 has BACK. The val is set at the step A6. At the step A6, the step A7 is set to be started.

When the SQ [q1] is not empty and the SQ [q0] is, second and hereafter, empty in a time of passing the step A3, namely, when process for deleting a layer of the foreground objects is ended, the conditions are given as follow. The values of q0 and q1 are set to be exchanged. The q2 is not changed. The conditions except those are not changed.

When the SQ [q2] is not empty and both of the SQ [q0] and SQ [q1] are empty in a time of passing the step A3, the conditions are set as follow. The pc is set at a front portion of a skeleton line length calculating subprogram. The q0 is set at a value of the q2. The conditions except those are not changed.

At the step A6, the process is executed in obedience to a sequence of command which is broadcasted from the control unit CNT. In addition, it is assumed that (i, j) hereafter represents the pointer to the image element which is popped at the step A5. The executable image element detecting subprogram section does not execute the any processes. When the LM (i, j) is FRONT and image elements at portions 1 to 8, as a center of the LM (i, j), in FIG. 4 are one of the states which are shown in FIG. 11, an image element deleting subprogram section rewrites the LM (i, j) to FIN. Otherwise, the image element deleting subprogram section rewrites the LM (i, j) to BACK. However, each of the processor elements PE, before the process, discriminates, through the communication paths A1 to A4, whether or not the processor element PE which is adjacent to oneself is in the middle of processing one of the image elements at the portions 1 to 8 in FIG. 4. When the processor element PE which is adjacent to oneself is in the middle of processing one of the image elements at the portions 1 to 8 in FIG. 4, the other processor element PE is started after end of the process of the processor element PE. Also, when the val is set at a condition that a value of the LM (i, j) after is written is FIN, the val is set at FIN. Otherwise, the val is set at a value of the LM (i, j) before is written. In a skeleton line length calculating subprogram section, the calculating device CAL of the specific processor element PE, through the communication paths A1 to A4, adds and tabulates the number of pointers which exist in the SQ [q0] of each of the processor elements PE to supply the result, as the process result, to the control unit CNT and thereafter all SQ [q0] are flashed (the all SQ [q0] become empty).

In FIG. 11, the portion 0 of FIG. 4 is represented by # and the values of the portions 1 to 8 of FIG. 4 in the view from this are represented by ".", "1", and "0". The "." represents BACK or FRONT, the "1" represents FRONT, and the "0" represents BACK.

Figure 12:
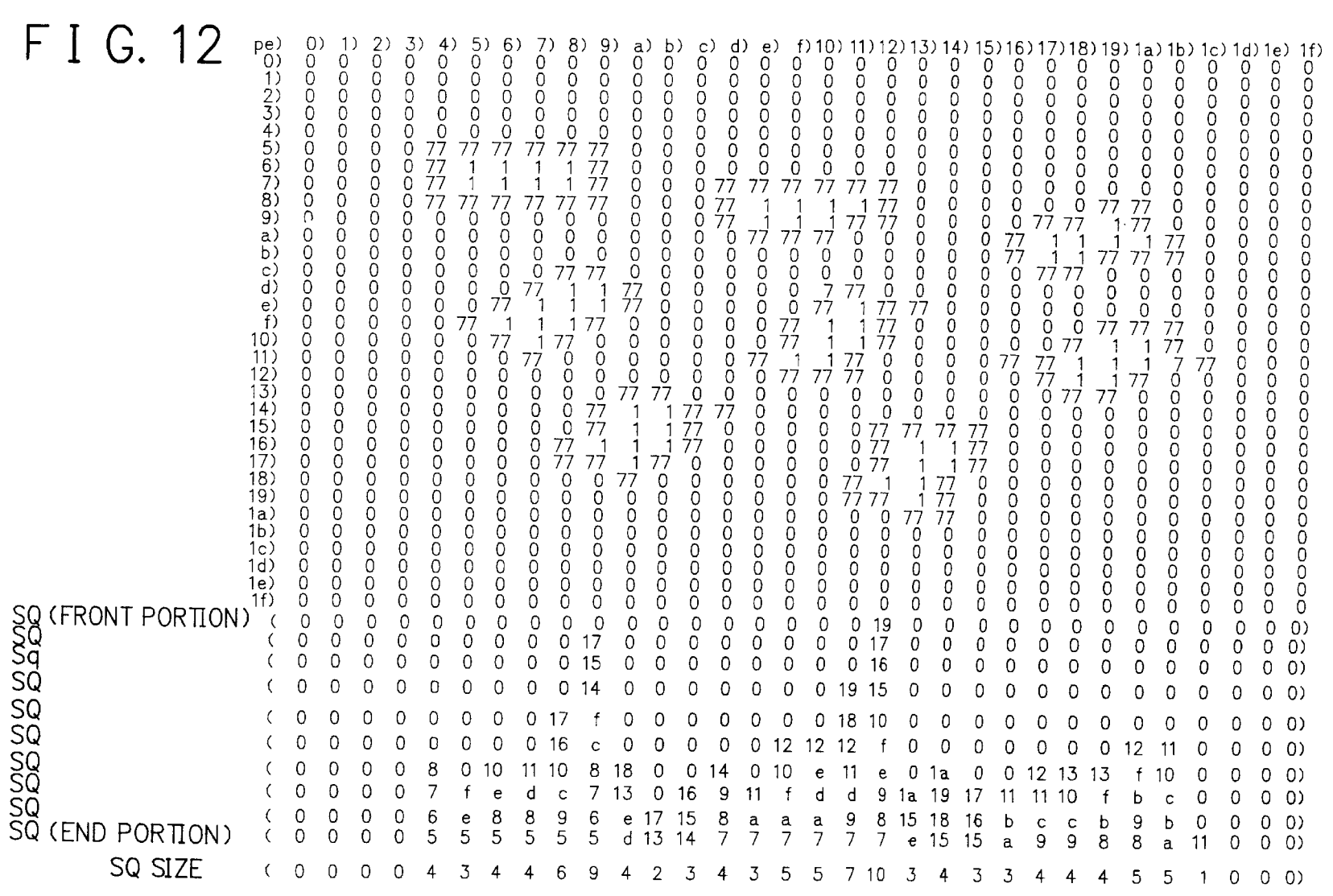
Figure 13:
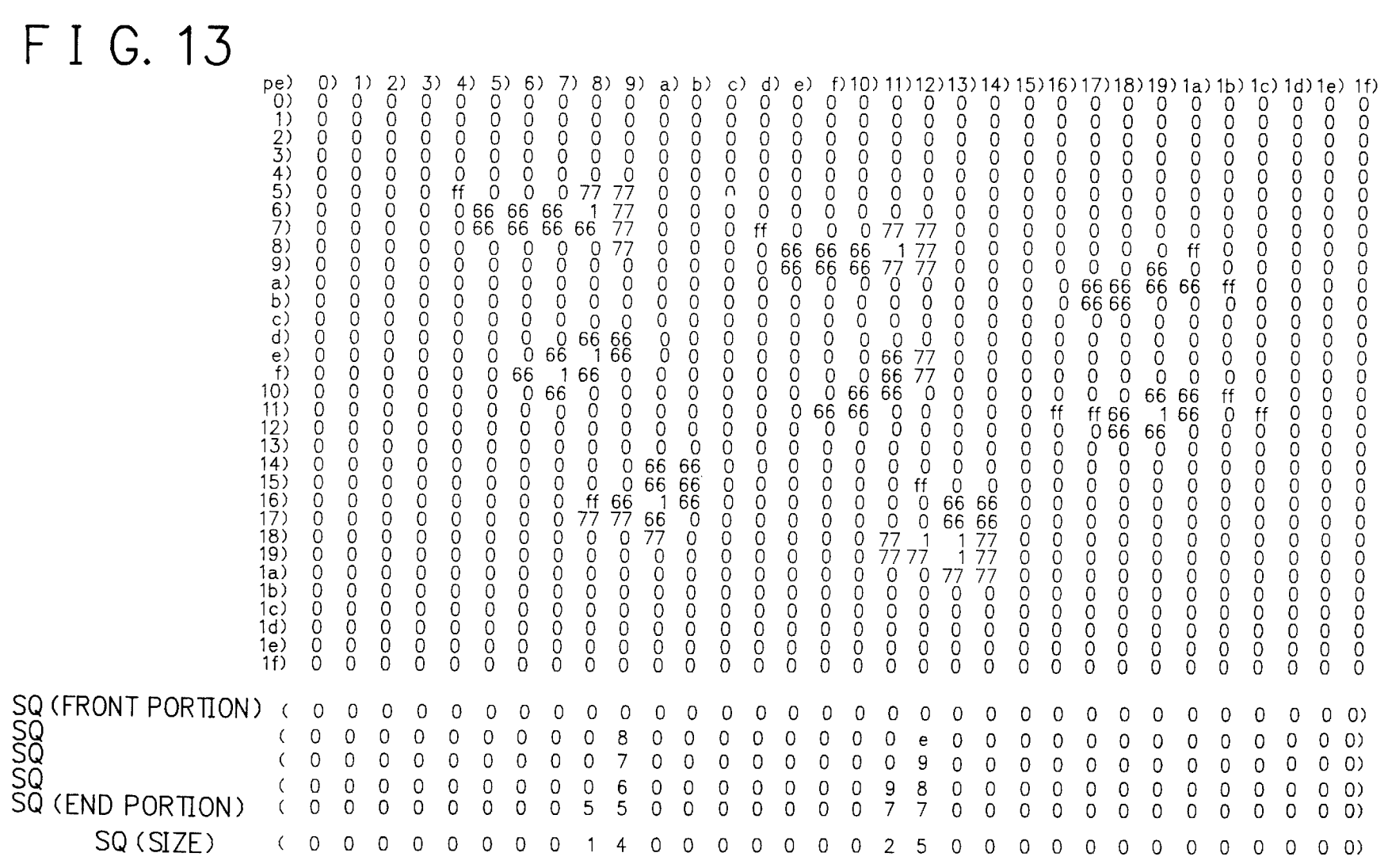
Figure 14:
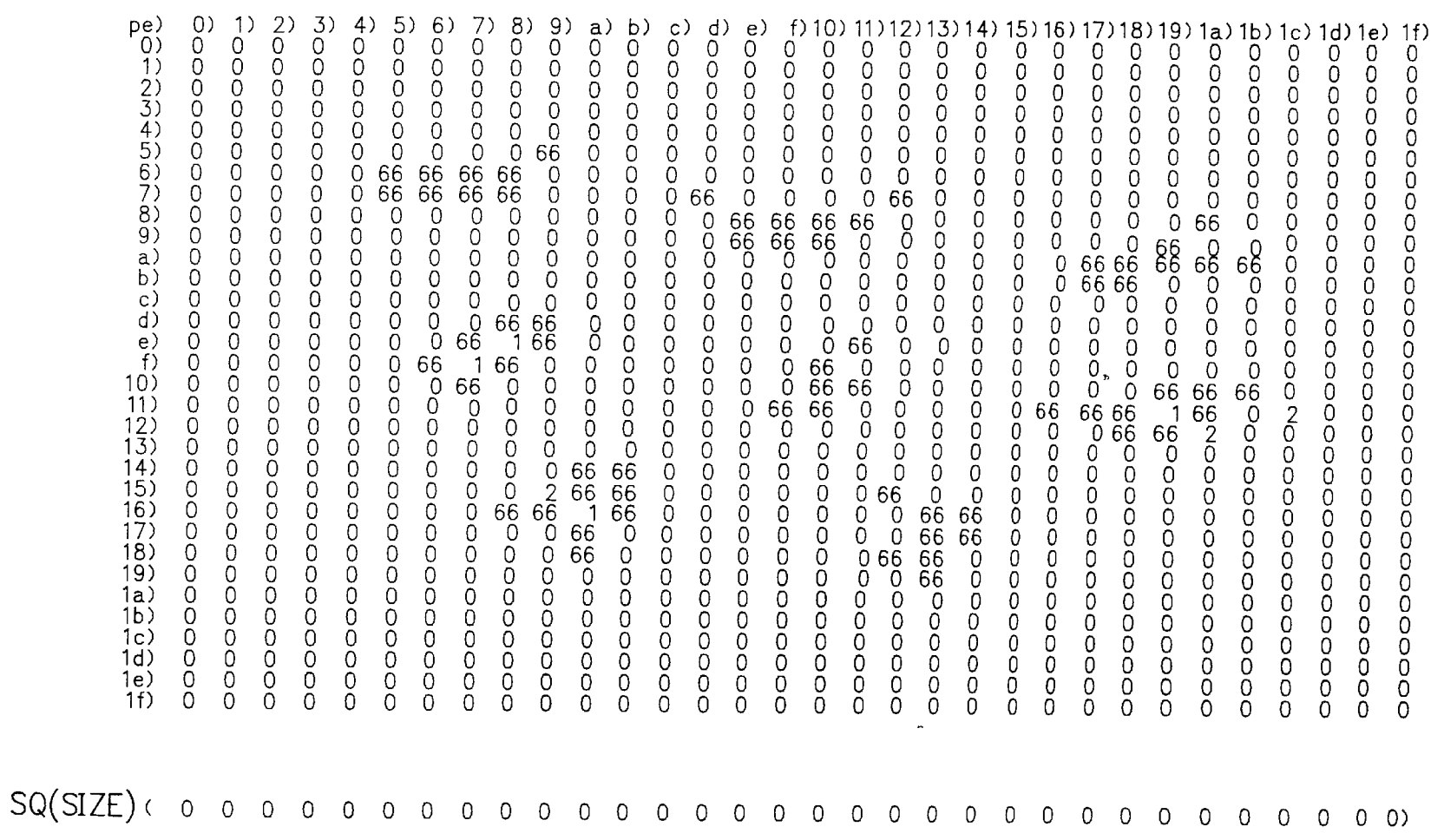
Figure 15:
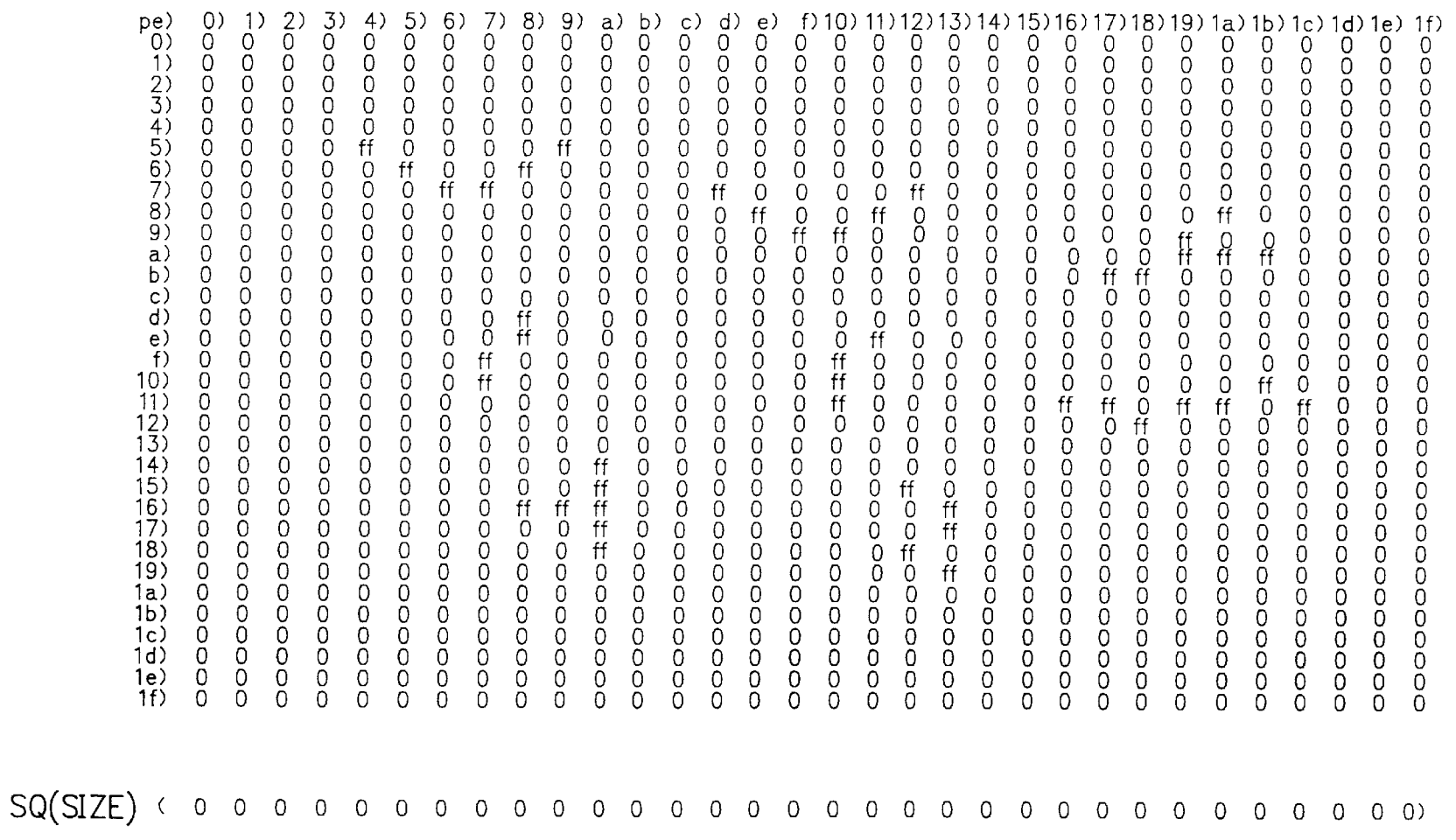
Figure 16:
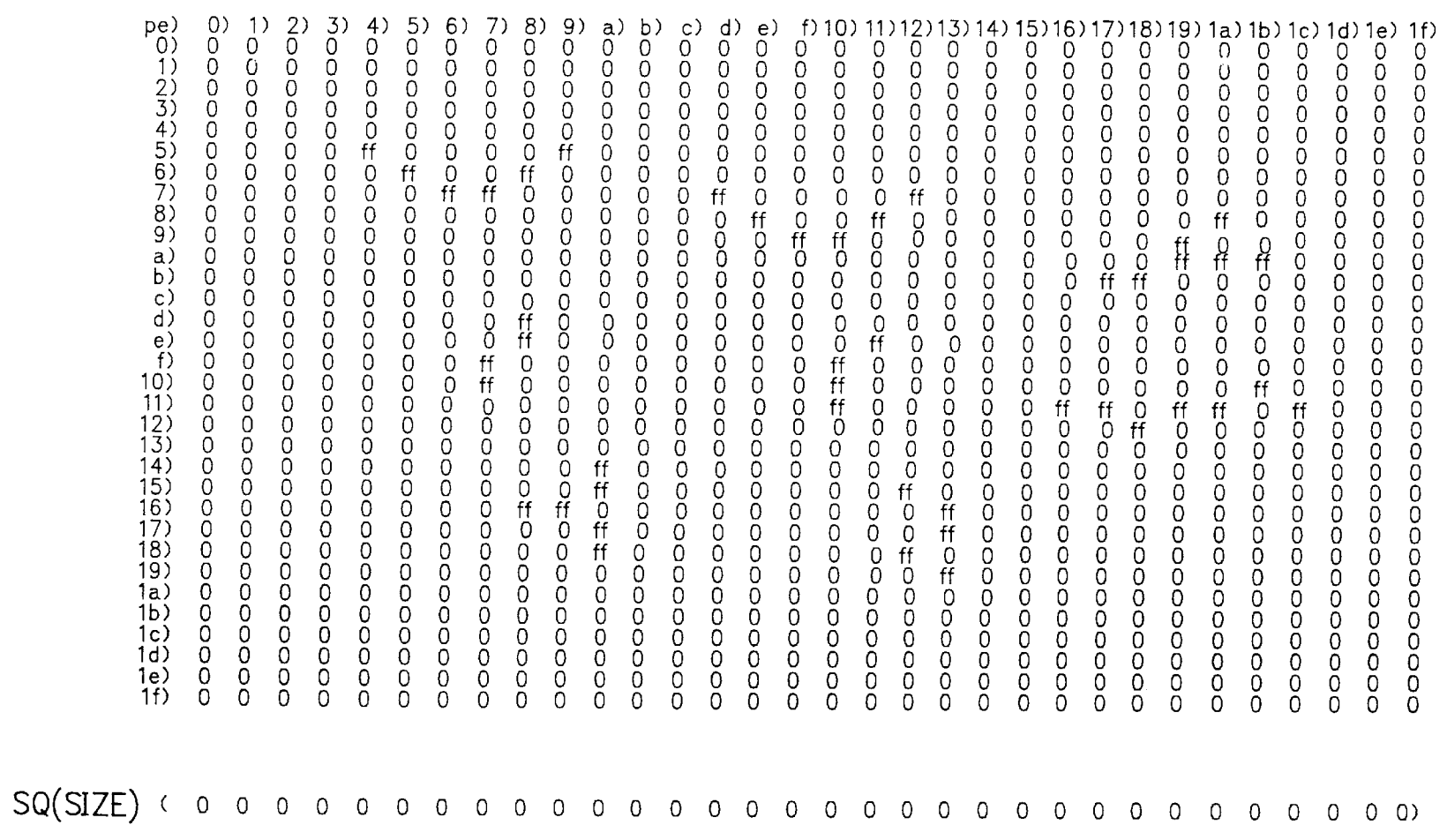

FIGS. 12 to 16 show progresses in the middle of the process and a final result of the process of the second concrete execution example which comprises the same processor array PARY and which processes the same test image of the first concrete execution example. Namely, FIG. 12 shows contents of the all LM and the SQ [q0] when the SQ [q0] becomes first empty and after the number q2 of the SQ that is not empty at the step A3 is substited to the q0. FIG. 13 shows contents of the LM and the SQ [q0] of the all processor elements PE after the process is repeated five times after the SQ [q0] becomes first empty. FIG. 14 shows contents of the LM and the SQ [q0] of the all processor elements PE when the SQ [q0] becomes second empty. FIG. 15 shows contents of the LM and the SQ [q0] of the all processor elements PE when the SQ [q0] becomes third empty. FIG. 16 shows contents of the LM and the SQ [q0] of the all processor elements PE when the SQ [q0] becomes fourth empty, namely, when the thinning process is ended.

In addition, in FIGS. 12 to 16, it is represented by ff that the value of LM is FIN. It is represented by 1 that the value of LM is FRONT. It is represented by 66 that the value of LM is FRONT and the pointer to this presently exists in the SQ [q2]. It is represented by 77 that the value of LM is FRONT and the pointer to this presently exists in the SQ [q0].

The description will be made as regards the number of process repeat times which needs in the thinning process of the binary image in FIGS. 14 to 17. The number of process repeat times is equal to 32 until the SQ [q0] is first empty. Next, the number of process repeat times is equal to 10 until the SQ [q0] is second empty. Next, the number of process repeat times is equal to 5 until the SQ [q0] is third empty. Next, the number of process repeat times is equal to 1 until the SQ [q0] is fourth empty, namely, until the thinning process is ended. The sum total of the number of process repeat times is equal to 48.

On the other hand, the number of process repeat times in the conventional manner is equal to 96. The conventional manner uses the conventional same processor array PARY in which the process is executed, in parallel, in the processor elements PE and the process is serially (in order) executed in each of the processor elements PE. Namely, each of the processor elements PE serially discriminates whether or not the image elements of 32 in each of LM realizes the deleting condition shown in FIG. 11. When the image elements of 32 in each of LM realizes the deleting condition shown in FIG. 11, each of the processor elements PE serially deletes the image element. Since, in case of the test image which has the image elements of 32×32, the number of layers to be deleted is equal to 3, the number of process repeat times in the conventional manner is equal to (32×3)=96. Namely, according to the second concrete execution example of the first embodiment of this invention, it is possible to execute the equal process in the number of process repeat times of ½ of that of the conventional manner.

Also, in case that the same image is enlarged, the first embodiment of this invention has remarkable effect. Namely, as shown in FIG. 17, for example, in case of the image of 256×256, according to the first embodiment of this invention, it is possible to execute the equal process in the number of process repeat times of ¹⁄₁₀ of that of the conventional manner.

The description will proceed to a second embodiment of this invention. In the above mentioned first embodiment of this invention, each of the processor elements PE has not a program memory IM and a program counter PC and all processor elements PE execute commands which are broadcasted from the control unit CNT. The first embodiment of this invention is based on, as it is called, the SIMD (Single Instruction Mutiple Data) system. On the other hand, in the second embodiment of this invention, although the same program is loaded in all processor elements PE, each of the processor elements PE can execute different portions of the same program because each of the processor elements PE has the program counter PC. The second embodiment of this invention is based on, as it is called, the SPMD (Single Program Mutiple Data) system.

Figure 18:
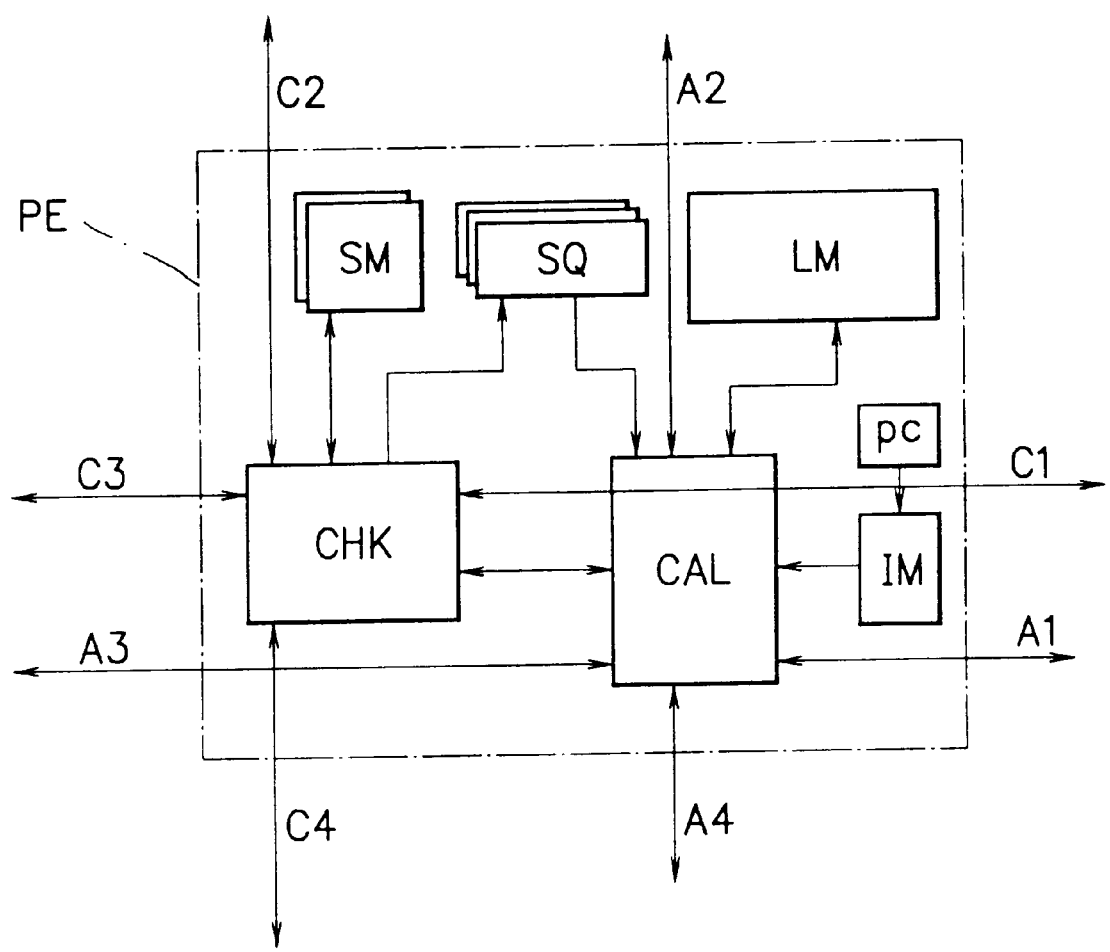
FIG. 18 is a block diagram of a processor element of an image processing system according to a second embodiment of this invention.
Figure 19:
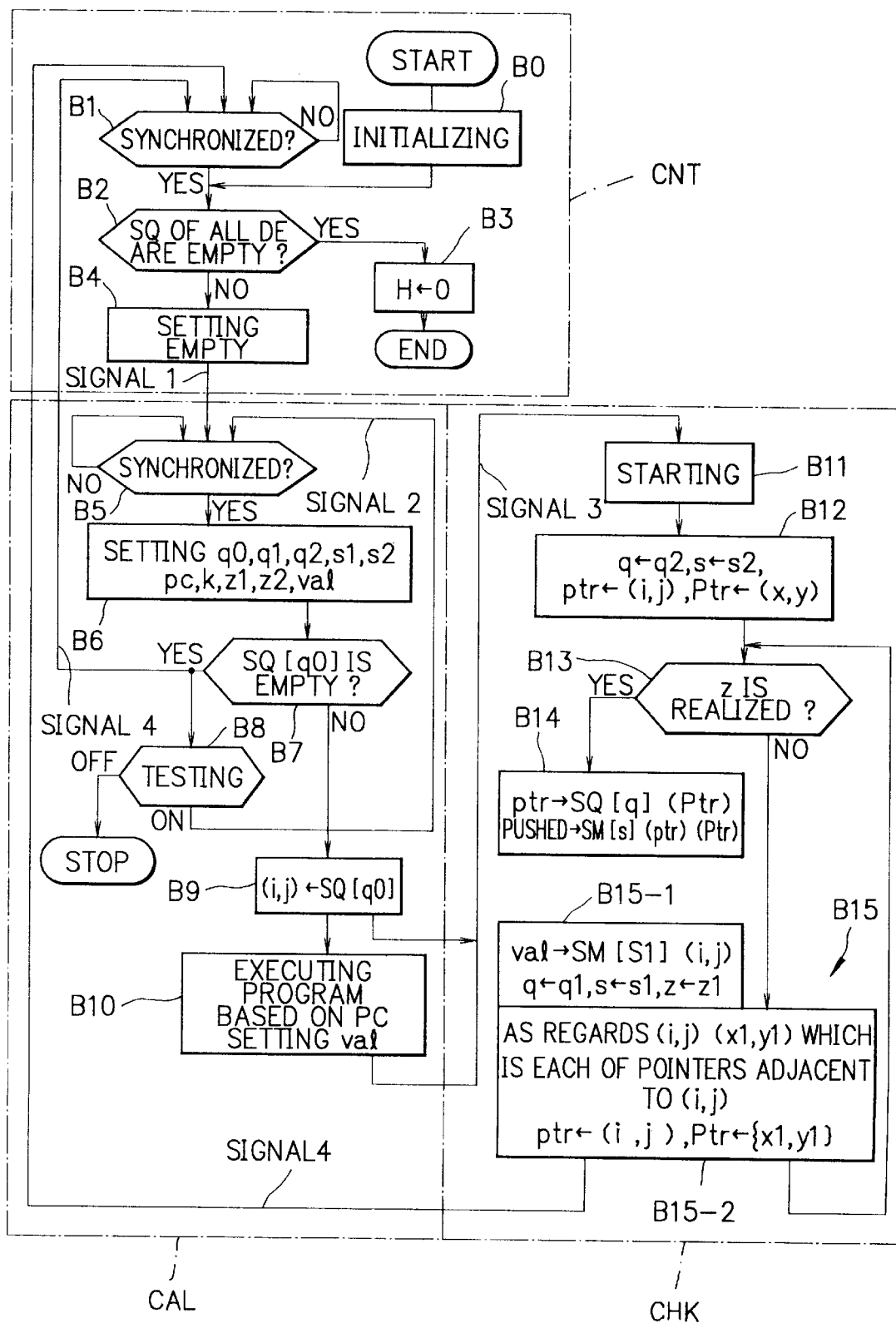
FIG. 19 is a flow chart for use in describing an operation of the image processing system illustrated in FIG. 18.

Referring to FIGS. 18 and 19, the second embodiment of this invention will be described in detail. FIG. 18 is a block diagram of each of processor elements PE {x, y} of a processor array of the image processing system according to the second embodiment of this invention. In FIG. 18, each of the processor elements PE {x, y} comprises an image element memorizing device LM {x, y}, a command memorizing device IM {x, y}, a program counter pc, a temporary pointer memorizing device SQ [q] {x, y}, an image element processing state memorizing device SM [s] {x, y}, a calculating device CAL {x, y}, and a detecting device CHK {x, y}. The image element memorizing device LM {x, y} memorizes image elements which are image data that are subjects of process. The command memorizing device IM {x, y} memorizes commands. The temporary pointer memorizing device SQ [q] {x, y} memorizes pointers of the image elements to be processed. The temporary pointer memorizing device SQ [q] {x, y} always outputs elements from a front portion of the elements and receives the elements from a front portion or an end portion of the elements. The temporary pointer memorizing device SQ [q] {x, y} comprises pointer memorizing devices which are equal in a number to Q, where Q represents an integer greater than one and q represents an integer between 0 to Q−1. The image element processing state memorizing device SM [s] {x, y} memorizes present processing states of the image elements in the image element memorizing device LM {x, y}. The image element processing state memorizing device SM [s] {x, y} comprises processing state memorizing devices which are equal in a number to S, where S represents an integer greater than one and s represents an integer between 0 to S−1. Each of the processing state memorizing devices comprises memorizing elements of about few bits.

The calculating device CAL {x, y} is connected to the image element memorizing device LM {x, y}, the command memorizing device IM {x, y}, the temporary pointer memorizing device SQ [q] {x, y}, and the detecting device CHK {x, y}. The calculating device CAL {x, y} takes out data from a front portion of the data in the temporary pointer memorizing device SQ [q] {x, y}. The calculating device CAL {x, y} reads out the command from the command memorizing device IM {x, y}. The calculating device CAL {x, y}. in response to the command from the command memorizing device IM {x, y}, executes reference and definition to each of the image elements in the image element memorizing device LM {x, y}.

Also, the calculating device CAL {x, y} has an arithmetical logical calculation capability which uses values of the image elements as operand. The detecting device CHK {x, y} is connected to the temporary pointer memorizing device SQ [q] {x, y}, the image element processing state memorizing device SM [s] {x, y}, and the calculating device CAL {x, y}. The detecting device CHK {x, y} supplies data to the calculating device CAL {x, y} and receives the data from the calculating device CAL {x, y}. The detecting device CHK {x, y} supplies data to the temporary pointer memorizing device SQ [q] {x, y}. The detecting device CHK {x, y} executes reference and definition to each of the image elements in the image element processing state memorizing device SM [s] {x, y}. Also, The detecting device CHK {x, y} has a logical calculation capability which calculates between the image elements.

Adjacent ones of the processor elements PE {x, y} are connected through communication paths A1 to A4. In case that X is equal to one, A1 and A3 are not existent. Also, in case that Y is equal to one, A2 and A4 are not existent. Adjacent ones of the detecting devices CHK {x, y} are connected through communication paths C1 to C4. In case that X is equal to one, C1 and C3 are not existent. Also, in case that Y is equal to one, C2 and C4 are not existent.

Next, referring to FIG. 19, an operation of the control unit CNT and the processor elements PE {x, y} in the processor array PARY will be described in detail. In addition, as explained below, as shown in the first embodiment of this invention, variables q, q0, q1, q2, s, s1, s2, EMPTY, k, Z, z1, z2, val, ptr, and Ptr are used. In this event, the variables q, q0, q1, and q2 are for specifying one of the pointer memorizing devices in the temporary pointer memorizing device SQ [q] {x, y} that are equal in a number to Q. The variables s, s1, and s2 are for specifying one of the processing state memorizing devices in the image element processing state memorizing device SM [s] {x, y} that are equal in a number to S.

The variable EMPTY is for representing one of the pointer memorizing devices in the temporary pointer memorizing device SQ [q] {x, y} that is empty. The variables k, Z, z1, z2 and val are for prescribing an operation of the detecting device CHK {x, y}. The variable ptr is for representing store of the pointer to the image element. The variable Ptr is for representing store of the pointer to the processor elements PE {x, y}. Also, in case that an ambiguity is specially not caused, in representation of PE {x, y}. {x, y} which is pointer to PE is omitted. Namely, the representation of PE {x, y} is only written by PE. In addition, in representation of such as LM {x, y}. SQ [q] {x, y}, SM [s] {x, y}, CAL {x, y}, and CHK {x, y}, {x, y} is omitted. For example, the representation of SQ [q] {x, y} is only written by SQ [q].

The processor array PARY executes steps B0 to B15. The control unit CNT executes the steps B0 to B4. Each of the processor elements PE {x, y} executes the steps B5 to B15. The calculating device CAL executes the steps B5 to B10. The detecting device CHK executes the steps B11 to B15.

At the step B0, the control unit CNT executes initialization. Namely, the control unit CNT broadcasts pointer (i, j) of suitable image element to each of the processor elements PE. In this event, in each of the processor elements PE, the detecting device CHK supplies the (i, j) to the suitable SQ. Also, the control unit CNT makes signals 1, 3, and 4 OFF and sets signal 2 and flag H at ON. The control unit CNT downloads the program to each of the LM. Thereafter, the step B0 proceeds to the step B2.

At the step B1, when all signals 4 from the all processor elements PE are ON, the control unit CNT judges that a synchronization is realized to make the signals 4 from all processor elements PE OFF. Thereafter, the step B1 proceeds to the step B2. At the step B2, the control unit CNT disciminates whether or not all SQ in all processor elements PE are empty. When all SQ in all processor elements PE are empty, the step B2 proceeds to the step B3. Otherwise, the step B2 proceeds to the step B4. At the step B3, the control unit CNT sets the flag H at OFF and broadcasts it to all processor elements PE. Thereafter, the control unit CNT ends the process. At the step B4, the control unit CNT sets variable EMPTY representing that any ones of the SQ of 0 to Q−1 are empty. Thereafter, the step B4 proceeds to the step B5.

At the step B5, the calculating device CAL judges whether or not a synchronization of the signals 1 and 2 is realized. When both of the signals 1 and 2 are ON, the step B5 proceeds to the step B6. Thereafter, the calculating device CAL makes the signals 1 and 2 OFF. At the step B6, the calculating device CAL, in response to the variable EMPTY, sets suitable variables between 0 to Q−1 as the variables q0, q1, and q2. The calculating device CAL, in response to the variable EMPTY, sets suitable variables between 0 to S−1 as the variables s0 and s1. Also, the calculating device CAL, in response to the variable EMPTY, sets suitable variables as the variables such as pc, k, z2, z1, and val.

The step B6 proceeds to the step B7 at which the calculating device CAL discriminates whether or not the SQ [q0] is empty. When the SQ [q0] is empty, the calculating device CAL sets the signal 4 at ON and thereafter the step B7 proceeds to the step B8. Otherwise, the step B7 proceeds to the step B9. At the step B8, the calculating device CAL discriminates whether or not the flag H is ON. When the flag H is ON, the calculating device CAL sets the signal 2 at ON. When the flag H is OFF, the calculating device CAL ends the process.

At the step B9, the calculating device CAL pops datum of the SQ [q0] from a head portion of the SQ [q0] and makes the signal 1 OFF. Also, in case of specifying, the calculating device CAL makes the signal 3 ON. The datum which is popped is pointer to the image element and is hereafter written (i, j). Also, the image element of the LM that is indicated by the (i, j) is written LM [s] (i, j).

The image element of the SM that is indicated by the s indicated by the (i, j) is written SM [s] (i, j). In addition, the calculating device CAL also supplies the (i, j) to the detecting device CHK.

At the step B10, the calculating device CAL fetches the command which is indicated by the pc from the IM. The calculating device CAL executes, in response to the command, the process of, for example, the image element LM (i, j) with making such as the adjacent image element operand and with increment of the pc. Also, in case of specifying, the calculating device CAL rewrites the values of such as the pc, q0, q1, q2, s0, s1, z2, z1, and val. In addition, when the adjacent image element of the image element LM (i, j) exists in another processor element PE, the calculating device CAL is supplied with the adjacent image element from the other processor element PE through the communication paths A1 to A4. Thereafter, in case of specifying, the calculating device CAL makes the signal 3 ON. The step B10 proceeds to the step B11.

At the step B11, when the signal 3 becomes ON, the detecting device CHK makes the signal 3 OFF. The step B11 proceeds to the step B12. At the step B12, the detecting device CHK substitutes q2, s2, z2, (i, j), and (x, y) to the variables q, s, Z, ptr, and Ptr. The step B12 proceeds to the step B13.

At the step B13, the detecting device CHK checks whether or not the condition Z is realized. In addition, the check is executed by the detecting device CHK of the processor element PE which is indicated by the Ptr, namely, the CHK (Ptr). Also, when it is necessary, in the check, to make reference to elements of the SM of the processor elements PE except the processor element PE indicated by the Ptr, the detecting devices CHK mutually supplies the elements to the other detecting devices CHK and mutually receives the elements from the other detecting devices CHK through the communication paths C1 to C4. When the condition Z is realized, the step B13 proceeds to the step B14. Otherwise, the step B13 proceeds to the step B15. At the step B14, the CHK (Ptr) inserts the ptr to the SQ [q] (Ptr) and sets the SM [s] (ptr) (Ptr) at PUSHED.

The step B15 comprises steps B15-1 and B15-2. At the step B15-1, the detecting device CHK substitutes val, q1, s1, and z1 to the SM [s1] (i, j), q, s, and z. Thereafter, at the step B15-2, the ptr is set at (i1, j1) and the Ptr is set at {x1, y1} in each of an adjacent pointer (i1, j1) {x1, y1} which is indicated by K of the (i, j). In this condition, the process of the steps B13, B14, and B15-2 is repeated in a number of the pointer, After the process is ended, the detecting device CHK makes the signal ON. In addition, the {x1, y1} represents pointer of the processor element PE in which an element indicated by (i1, j1) is existent. In case that an element indicated by the (i, j) and an element indicated by the (i1, j1) exist in the same processor element PE, the {x1, y1} is equal to the {x, y}.

The above mentioned operation of the image processing system according to the second embodiment of this invention is put in order as follow. At the step B0, the control unit CNT downloads the same program to all processor elements PE. Also, the pointer of the image element to be first processed is stored in a suitable SQ of 0 to Q−1. Next, in the repeated operation of the steps B1 to B15, the control unit CNT, the calculating device CAL, and the detecting device CHK are operated as follow.

At the steps B1 to B4, the control unit CNT discriminates whether or not all SQ are empty. When all SQ are empty, the control unit CNT makes the flag H OFF to stop all process. Otherwise, the control unit CNT supplies the variable EMPTY to each of the processor elements PE. The variable EMPTY represents that any ones of the SQ are empty.

At the steps B5 to B15, each of the processor elements PE sets, in response to the variable EMPTY, the pc. Each of the processor elements PE sets, in response to the variable EMPTY, suitable SQ numbers to the q0, q1, and q2. Each of the processor elements PE sets, in response to the variable EMPTY, suitable SM numbers to the s1 and s2. Each of the processor elements PE sets, in response to the variable EMPTY, suitable values as the variables such as k, z2, z1, val, q, s, Z, ptr, and Ptr which prescribe the operation of the detecting device CHK. The calculating device CAL takes the pointer to the image element to be processed and processes the image element indicated by the pointer until the SQ [q0] is empty. The detecting device CHK detects the image element to be next processed and stores the pointer of the image element to SQ [q1] or SQ [q2].

If the other SQ which is not empty in the processor element PE when the SQ [q0] becomes empty in the same processor element PE, the processor element PE, in accordance with instruction of the program, sets the q0, q1, and q2 at the other SQ numbers which are not empty and sets the s1 and s2 at corresponding suitable SM numbers. In the condition, the above mentioned repeated operation is restarted.

The second embodiment of this invention has following different points in comparision with the first embodiment of this invention because the second embodiment comprises the processor elements PE each of which has the program memory IM and program counter pc. As shown in FIG. 19, the second embodiment sets such as the q0, q1, q2, s1, s2, pc, k, z1, and z2 in each of the processor elements PE. The second embodiment comprises the flag H which is for stopping the operation of each of the processor elements PE. The second embodiment is capable of asynchronously operating the control unit CNT and each of the processor elements PE. Also, the second embodiment is capable of asynchronously operating the calculating device CAL and the detecting device CHK in the processor element PE.

In comparision with the second embodiment, the first embodiment has not the the program memory IM and program counter pc (FIG. 18) and decreases sizes of the S and Q which represent numbers of the SM and SQ.

In addition of the effect of the first embodiment, the second embodiment has an effect that it is easily possible to, in superimposition, operate a plurality of independent tasks. Namely, since each of the tasks are assigned to respective sets of the SQ and respective SM, the SQ and SM which correspond to the other tasks are changed to the process subjects in each of the processor elements PE when the SQ which correspond to a task becomes empty. As a result, it is possible to increase an availability factor of each of the processor elements PE.

The second embodiment has another effect that it is possible to, in superimposition, operate the tasks which are interdependent, namely, have a dependent relation that a following task uses a process result of a preceding task. Therefore, the second embodiment has the other effect that it is possible to start the following task before end of the preceding task. Namely, while a specific set of the SQ (for example, SQ [q0] and SQ [q1]) and a specific SM (for example, SM [s1]) which memorizes a process result execute a preceding task to produce a preceding process result and to, in order, input the preceding process result another specific SQ (for example, SQ [q2]]), another specific SM (for example, SM [s2]) memorizes the process result of other specific SQ. Thereby, when the SQ which corresponds to the process of the preceding task is temporarily empty, the SQ and SM which are the process subjects are changed to the SQ (in this event, SQ [q2]) which memorizes the preceding process result and the SM (in this event, SM [s2]) which memorizes the following task. In this event, it is possible to process, at that time, a part of the following task which is capable of being processed in the intervals of the process of the preceding task.

As above mentioned, the image processing system of this invention comprises a device which dynamically detects the image element which is capable of being processed and a device which dynamically supplies the image element detected to a calculating section. More concretely, the image processing system of this invention comprises a memorizing section (the SM in FIG. 2) which memorizes a present image element processing state, a detecting section (the CHK in FIG. 2) which makes reference to the present image element processing state to detect whether or not an image element which is positioned near to an image element of present process is capable of being processed, and a temporary memorizing section (the SQ in FIG. 2) which memorizes the image element capable of being processed.

Also, the image processing system of this invention comprises a mechanism which detects the image element capable of being processed and dynamically supplies a pointer of the image element to a calculating section. More concretely, the image processing system of this invention comprises the mechanism which has steps (the steps A9 and A10 in FIG. 3) which memorize a present image element processing state, a step (the step A8 and A10 in FIG. 3) which makes reference to the present image element processing state to detect whether or not an image element which is positioned near to an image element of present process is capable of being processed, and a step (the step A9 and A10 in FIG. 3) temporarily memorizes the image element capable of being processed.

According to a first effect of this invention, it is possible to increase process effeciency of an image process algorithm which has a collating sequence in the process of the image elements and which is incapable of processing, in parallel, the image elements. Namely, in the image process algorithm of repeat type that is necessary to execute the process of the image elements with dependent relation of the image elements, it is possible to decrease the number of the process repeat. This is because it is impossible to dynamically detect the image element which needs to be processed.

According to a second effect of this invention, it is possible to decrease number of processes which are necessary to each of the repeat process in the the image process algorithm of repeat type. This is because the detection device which detects the image element which is necessary to be processed operates, in parallel, to the calculating section which executes conventional calculation.

According to a third effect of this invention, it is possible to decrease a cost of hardware in comparision with the conventional image processing system which comprises the execution control system which is based on data operation of the command level. This is because the image processing system of this invention needs not to produce the packet having the all data of the execution control in the conventional manner and the processor elements PE of the image processing system of this invention supplies and receives the image elements. Namely, the processor elements PE of the image processing system of this invention supplies and receives simple data which are pointers.

According to a fourth effect of this invention, it is possible to decrease the overhead which occurs in the execution and control in comparison with the conventional image processing system which comprises the execution control system which is based on data operation of the command level. This is because the image processing system of this invention is an execution control system which is based on data operation of an image element level. Therefore, the image processing system of this invention processes, as a pipeline type, the image elements even when a serial sequence of the commands is executed.

What is claimed is:

1. An image processing system comprising:

image element memorizing means for memorizing image elements which are image data that are subjects of process;

pointer detecting means for detecting a pointer of one of said image elements that is capable of being processed by said image processing system, said pointer representing a position of the one of said image elements;

temporary pointer memorizing means connected to said pointer detecting means for memorizing said pointer from said pointer detecting means; and calculating means connected to said image element memorizing means and said temporary pointer memorizing means for reading said pointer and processing an image in response to an image element only when said image element of said pointer which is read is capable of being processed.

2. An image processing system comprising:

image element memorizing means for memorizing image elements which are image data that are subjects of process;

image element processing state memorizing means for memorizing present processing states of said image elements in said image element memorizing means;

pointer detecting means connected to said image element processing state memorizing means for detecting, in response to said present processing states, a pointer of one of said image elements that is capable of being processed by said image processing system, said pointer representing a position of the one of said image elements;

temporary pointer memorizing means connected to said pointer detecting means for memorizing said pointer from said pointer detecting means; and calculating means connected to said image element memorizing means and said temporary pointer memorizing means for reading said pointer and processing an image in response to an image element only when said image element of said pointer which is read is capable of being processed.

3. An image processing system comprising:

image element memorizing means for memorizing image elements which are image data that are subjects of process;

image element processing state memorizing means for memorizing present processing states of said image elements in a plurality of tasks in said image element memorizing means;

pointer detecting means connected to said image element processing state memorizing means for detecting, in response to said present processing states, a pointer of one of said image elements that is capable of being processed by said image processing system, said pointer representing a position of the one of said image elements;

temporary pointer memorizing means connected to said pointer detecting means for memorizing said pointer in each of said tasks from said pointer detecting means; and calculating means connected to said image element memorizing means and said temporary pointer memorizing means for reading said pointer and processing an image in response to an image element only when said image element of said pointer which is read is capable of being processed.

4. An image processing system comprising:

image element memorizing means for memorizing image elements which are image data that are subjects of process;

image element processing state memorizing means for memorizing present processing states of said image elements in a plurality of tasks in said image element memorizing means;

pointer detecting means connected to said image element processing state memorizing means for detecting, in response to said present processing states, a pointer of one of said image elements that is capable of being processed by said image processing system, said pointer representing a position of the one of said image elements;

temporary pointer memorizing means connected to said pointer detecting means for memorizing said pointer in each of said tasks from said pointer detecting means;

calculating means connected to said image element memorizing means and said temporary pointer memorizing means for reading said pointer and processing an image in response to an image element only when said image element of said pointer which is read is capable of being processed; and task changing means connected to said temporary pointer memorizing means and said calculating means for changing one of said tasks to another of said tasks which is processed by said calculating means when a process of said image elements of said pointer in the one of said tasks is ended.

5. An image processing method comprising:

memorizing image elements which are image data that are subjects of process;

detecting a pointer of one of said image elements that is capable of being processed by said image processing method, said pointer representing a position of the one of said image elements;

memorizing said pointer from said step of detecting a pointer; and reading said pointer and processing an image in response to an image element only when said image element of said pointer which is read is capable of being processed.

6. An image processing method comprising:

memorizing image elements which are image data that are subjects of process;

memorizing present processing states of said image elements in said step of memorizing image element;

detecting, in response to said present processing states, a pointer of one of said image elements that is capable of being processed by said image processing method, said pointer representing a position of the one of said image elements;

memorizing said pointer from said step of detecting a pointer; and reading said pointer and processing an image in response to an image element only when said image element of said pointer which is read is capable of being processed.

7. An image processing method comprising:

memorizing image elements which are image data that are subjects of process;

memorizing present processing states of said image elements in said step of memorizing image element;

detecting, in response to said present processing states, a pointer of one of said image elements that is capable of being processed by said image processing method, said pointer representing a position of the one of said image elements;

memorizing said pointer in each of said tasks from said step of detecting a pointer; and reading said pointer and processing an image in response to an image element only when said image element of said pointer which is read is capable of being processed.

8. An image processing method comprising:

memorizing image elements which are image data that are subjects of process;

memorizing present processing states of said image elements in a plurality of tasks in said step of memorizing image element;

detecting, in response to said present processing states, a pointer of one of said image elements that is capable of being processed by said image processing method, said pointer representing a position of the one of said image elements;

memorizing said pointer in each of said tasks from said step of detecting a pointer;

reading said pointer and processing an image in response to an image element only when said image element of said pointer which is read is capable of being processed; and changing one of said tasks to another of said tasks which is processed by said step of processing an image when a process of said image elements of said pointer in the one of said tasks is ended.

9. An image processing system comprising:

a control unit for broadcasting pointers of image elements, each of said pointers representing a position of one of said image elements; and a processor array comprising a plurality of processor elements, each processor element comprised of:

an image element memorizing device, said image element memorizing device storing image elements which are image data that are subjects of process;

an image element processing state memorizing device, said image element processing state memorizing device storing a present processing state of image elements stored in said image element memorizing device;

a pointer detecting device, said pointer detecting device detecting a pointer of one of said image elements that is capable of being processed by said image processing system;

a temporary pointer memorizing device, said temporary pointer memorizing device storing pointers received from the control unit; and a calculating device connected to said image element memorizing device and said image element processing state memorizing device, said calculating device reading said pointer and processing an image in response to an image element only when said image element of said pointer which is read is capable of being processed.

* * * * *